US008548929B1

(12) United States Patent  (10) Patent No.: US 8,548,929 B1
Goodwin et al.  (45) Date of Patent: Oct. 1, 2013

(54) METHODS AND SYSTEMS OF EMPLOYMENT CANDIDATE DATA MANAGEMENT

(75) Inventors: Gregory Goodwin, Jacksonville, FL (US); Andrew L. Anderson, Jacksonville, FL (US); Stefan Zander, Jacksonville, FL (US); Narciso Tauler, Jacksonville, FL (US); William J. Brannen, Jacksonville, FL (US); Candice B. Morris, Jacksonville, FL (US)

(73) Assignee: Citicorp Credit Services, Inc., Long Island City, NY (US)

( * ) Notice: Subject to any disclaimer, the term of this patent is extended or adjusted under 35 U.S.C. 154(b) by 2899 days.

(21) Appl. No.: 10/458,116

(22) Filed: Jun. 10, 2003

Related U.S. Application Data

(60) Provisional application No. 60/388,142, filed on Jun. 10, 2002, provisional application No. 60/388,146, filed on Jun. 10, 2002.

(51) Int. Cl.
*G06Q 10/00* (2012.01)
(52) U.S. Cl.
USPC .......................... 705/321; 705/320; 705/7.42
(58) Field of Classification Search
USPC .................... 705/1, 7–10, 320, 321, 7.42, 11; 707/511, 203, 514, 104.1, 3
See application file for complete search history.

(56) References Cited

U.S. PATENT DOCUMENTS

| | | | | |
|---|---|---|---|---|
| 5,978,768 | A * | 11/1999 | McGovern et al. | 705/1 |
| 6,144,943 | A * | 11/2000 | Minder | 705/11 |
| 6,266,659 | B1 * | 7/2001 | Nadkarni | 707/3 |
| 6,363,376 | B1 * | 3/2002 | Wiens et al. | 1/1 |
| 6,370,510 | B1 * | 4/2002 | McGovern et al. | 705/1 |
| 6,385,620 | B1 * | 5/2002 | Kurzius et al. | 707/104.1 |
| 6,529,597 | B1 * | 3/2003 | Barrett | 379/265.02 |
| 6,560,620 | B1 * | 5/2003 | Ching | 715/229 |
| 6,618,734 | B1 * | 9/2003 | Williams et al. | 1/1 |
| 7,212,985 | B2 * | 5/2007 | Sciuk | 705/8 |
| 2002/0029159 | A1 * | 3/2002 | Longden | 705/7 |

(Continued)

FOREIGN PATENT DOCUMENTS

WO    WO 01/33421 A1 *   5/2001

OTHER PUBLICATIONS

"Web Sites in Category Test Authoring" [online], [retrieved on Aug. 20, 2004], *World of Education*, Retrieved from the Internet: http://dirs.educationworld.net/cat/291005/, 3 pp.

(Continued)

*Primary Examiner* — Traci L. Casler
*Assistant Examiner* — Bob R Chumpitaz
(74) *Attorney, Agent, or Firm* — John M. Harrington; Johnson, Marcou & Isaacs, LLC

(57) ABSTRACT

A method and system for managing employment candidate data utilizes a pre-screen application to enable pre-screening of employment candidates who log on to a website and are prompted to enter additional information and schedule pre-employment tests via the website. The method and system for managing employment candidate data also uses a tracking and testing application to handle screening of candidates' paper-based applications, administration of interviews, hiring pool management, job offer support, and scheduling of training, and is integrated with an applicant tracking system. A resume tracking application of the method and system for managing employment candidate data automatically identifies and merges duplicate resume information to create a single unique resume in the tracking system.

25 Claims, 25 Drawing Sheets

(56) References Cited

U.S. PATENT DOCUMENTS

| | | | | |
|---|---|---|---|---|
| 2002/0055866 | A1* | 5/2002 | Dewar | 705/8 |
| 2002/0128894 | A1* | 9/2002 | Farenden | 705/8 |
| 2003/0071852 | A1* | 4/2003 | Stimac | 345/810 |

OTHER PUBLICATIONS

"Welcome to Home Page of abc.test" [online], Copyright 2000-2003 [retrieved on Aug. 20, 2004], *abc.test*, Retrieved from the Internet: http://www.turbo-editor.com/abctest/default.htm, 1 p.

Chariot Software Group, Software & Services for Testing & Instructional Management [online], [retrieved on Aug. 20, 2004], Retrieved from the Internet: http://www.chariot.com/mtp_inst_prod_page.html, 1 p.

Cogent Computing Corporation [online], [retrieved on Aug. 20, 2004], Retrieved from the Internet: http://cqtest.com/, 1 p.

"Algorithmic online Test Makers" [online], [retrieved on Aug. 20, 2004], Retrieved from the Internet: http://www.image-ination.com/, 3 pp.

Question*mark* [online], Copyright 1995, 2002 [retrieved on Aug. 20, 2004], Retrieved from the Internet: http://www.questionmark.com/uk/home.htm, 4 pp.

"About Fastmarking" [online], Copyright 1999 [retrieved on Aug. 20, 2004], Retrieved from the Internet: http://www.fastmarking.com/about.html, 2 pp.

"Send Free Greeting Cards" [online], [retrieved on Aug. 20, 2004], Retrieved from the Internet: http://www.dgreetings.com/, 3 pp.

"Eliminate the Guesswork: Build for Success" [online], *Kenexa Prove It!*, [retrieved on Aug. 20, 2004], Retrieved from the Internet: http://www.proveit.com/default.asp, 2pp.

"Information on Applicant Testing Products" [online], *Work Skills First, Inc.*, [retrieved on Aug. 20, 2004], Retrieved from the Internet: http://www.workskillsfirst.com/1002About_work_skills_first.htm, 4 pp.

Interviewquest.com [online], 1999-2004 [retrieved on Aug. 20, 2004], Retrieved from the Internet: http://www.interviewquest.com/, 2 pp.

"Monster, Today's the Day" [online], Copyright 2004 [retrieved on Aug. 20, 2004], Retrieved from the Internet: http://www.monster.com/.

"Hot Jobs" [online], Copyright 2004 [retrieved on Aug. 20, 2004], Retrieved from the Internet: http://hotjobs.yahoo.com/, 1 p.

"Integrated Background Screening" [online], *AbsoluteHire*, Copyright 1999-2004 [retrieved on Aug. 20, 2004], Retrieved from the Internet: https://www.absolutehire.com/, 1 p.

"Plant-Wide Research" [online], *ROI Systems*, [retrieved on Aug. 20, 2004], Retrieved from the Internet: http://store.yahoo.com/plant-wide/roisystems.html, 1 p.

\* cited by examiner

FIG. 4

Credit Cards Careers

Operations Pre-Screen : Jacksonville, FL

• Prescreen Home

• Privacy • Citigroup Careers • Cards University Recruiting • CitiCards.com • Citibank.com
• Home • Careers at Cards • About Cards ▾ Life at Cards ▾ Locations ▾ Join Our Team ▾ Site Help Customer Service Sales Associate

Please complete the following questionnaire. When you are finished, press the submit button to send your response.

|   |   | YES | NO |
|---|---|---|---|
| 1. | Not including temporary employment status, have you previously been employed with any Citibank or Citigroup affiliate company? | ○ | ○ |
| 2. | Are you less than 18 years of age? | ○ | ○ |
| 3. | If hired, can you submit proof of your legal right to work in the United States? | ○ | ○ |
| 4. | All candidates who are offered a position with Citibank will be required to successfully complete a pre-employment drug test, background check and fingerprint screen. Do you wish to proceed? | ○ | ○ |
| 5. | Are you willing to work a variable schedule, which may include evenings, weekends, and/or holidays? | ○ | ○ |
| 6. | Do you have experience using computers to enter and look up information, including familiarity with the keyboard and mouse? | ○ | ○ |
| 7. | Based on experience, the starting salary for this position is between $9.25 and $11.00 per hour. Is this acceptable to you? | ○ | ○ |
| 8. | If hired, you will be required to attend a 5-week, full-time paid training program. Are you willing to attend this program? | ○ | ○ |
| 9. | Are you interested in a full-time position? | ○ | ○ |

FIG. 6

FIG. 13 citi cards human resources

· citiweb · cards intranet · help
· home · hr apps · forms · site map · locations

Candidate Pool

Please Select Position for which you wish to view the candidate pool.

Position: Customer Service Associate

Candidate Pool

Add Candidate to Pool

| Name | Int | US | Test | Int | Exp | Pool | Extend Offer |
|---|---|---|---|---|---|---|---|
| Orum, Amy E<br>Notes | RKryspin\ | 04/24/2001 8:00:00 AM | 388 | M01A11L00 | 60 | 1 | Make Offer |
| Scudder, Aisha M<br>Notes | HMcRae\ | 06/07/2001 8:00:00 PM | 339 | M03A09L00 | 60 | 2 | Make Offer |
| Cox, Vanessa A<br>Notes | MSims\ | 05/15/2001 8:00:00 AM | 389 | M00A12L00 | 60 | 3 | Make Offer |
| Funches, Shayna Y<br>Notes | KBurney\ | 06/05/2001 8:00:00 AM | 332 | M02A09L02 | 60 | 4 | Make Offer |
| Ford, Katrina L<br>Notes | BOsborne\ | 05/17/2001 8:00:00 PM | 367 | M00A12L00 | 60 | 5 | Make Offer |
| Craig, Stephanie L<br>Notes | CAppleman\ | 04/05/2001 8:00:00 PM | 398 | M05A07L00 | 55 | 6 | Make Offer |
| McDowell, Arlene C<br>Notes | DNewin\ | 05/22/2001 8:00:00 AM | 329 | M02A10L00 | 56 | 7 | Make Offer |
| Harmel, Mark R<br>Notes | EDette\ | 06/07/2001 8:00:00 PM | 376 | M00A12L00 | 36 | 8 | Make Offer |
| Casto, Melissa A<br>Notes | BTelesso\ | 04/03/2001 8:00:00 AM | 337 | M00A12L00 | 60 | 9 | Make Offer |
| Brakenridge, Michael A<br>Notes | EDette\ | 05/15/2001 8:00:00 AM | 393 | M03A09L00 | 20 | 10 | Make Offer |
| Subhani, India R<br>Notes | RKryspin\ | 04/12/2001 8:00:00 PM | 345 | M00A12L00 | 52 | 11 | Make Offer |

ResuMerge - Resume List

| Source Code | First Name | Middle Name | Last Name | Received |
|---|---|---|---|---|
| EADNALBTRB | John | | Smith | 09/24/2001 |
| MON | John | | Smithers | 08/13/2001 |
| EJFNAACP | John | | Smith | 10/19/2001 |
| AQBAN | John | A | Smith jr. | 12/07/2000 |
| RAD | John | A | Smith | 06/13/2001 |
| INTERN | John | A. | Smith | 12/13/2000 |
| UNSOLICSAX | John | Aaron | Smith | 01/17/2001 |
| MON | John | C | Smith ii | 01/11/2001 |
| YACOM | John | C | Smith | 07/24/2001 |
| EADNSAXSAE | John | C. | Smith | 03/29/2001 |
| EMPGUI | John christian | Christian (Chris) | Smith | 11/30/2001 |
| HJCOM | John | D | Smith | 08/14/2001 |
| PURECARBON | John D. | D. | Smith | 02/27/2002 |
| YACOM | John | E. "Jack" | Smith | 10/27/1998 |
| EADCOMPwRK | John | G. | Smith | 03/16/2000 |
| ECRLICWHA | John | G. | Smithwick | 09/26/2000 |
| HJCOM | John | H | Smith | 11/09/2000 |
| HJCOM | John | M | Smith | 12/08/2000 |
| HJCOM | John | M | Smith | 02/12/2001 |
| HJCOM | John | M | Smith | 02/14/2001 |
| CBCOM | John | M | Smith | 03/15/2001 |
| LVJOBS | John | R | Smith Chambers | 07/20/2001 |
| CHITRI | Johnny | R | Smith | 08/06/2001 |
| EMPLRE | Johnie | Robert | Smith | 03/20/2001 |
| EMPLRE | Johnathan | | Smith | 08/09/2001 |
| UNSOLICSF | John | S | Smith | 11/15/2001 |
| HEAHUN | John | W | Smith | 05/09/2001 |
| HEAHUN | John | W | Smith | 06/11/2001 |
| MON | John | | Smith | 10/02/2001 |

[Compare] [Close]

METHODS AND SYSTEMS OF EMPLOYMENT CANDIDATE DATA MANAGEMENT

PRIORITY APPLICATION

This application claims the benefit of U.S. Provisional Application No. 60/388,142 filed Jun. 10, 2002 entitled "Methods and Systems of Data Management" and incorporated herein by this reference.

This application claims the benefit of U.S. Provisional Application No. 60/388,146 filed Jun. 10, 2002 entitled "Methods and Systems of Employment Data Management" and incorporated herein by this reference.

FIELD OF THE INVENTION

The present invention relates generally to the field of employment candidate data management, and more particularly to methods and systems for employment candidate recruitment, pre-screening, scheduling, testing, tracking, staffing, and resume data management.

BACKGROUND OF THE INVENTION

In the past, pre-screening candidates for example, for high-volume, non-exempt hiring was handled by telephone, and in an early attempt at automation, candidates were asked to call a voice response unit (VRU) number. After pre-screening by telephone, the candidates are scheduled manually, and manually pre-screening and scheduling candidates is likewise a very expensive and time consuming process. Also, manually testing, tracking, and staffing, for example, for high-volume, non-exempt hiring is a vast administrative process, which is very expensive and time consuming. When done manually, as was the practice in the past, the process is very inefficient, and the results are haphazard at best. In the manual process, candidates are typically hired on a first-come, first-to-pass-a-test basis, without the benefit of seeing a pool of passing candidates and being able to select the top candidates from the pool. Further, manually scheduling candidates into training sessions also presents major problems in coordinating, for example, with training personnel to determine when training classes are available. There is currently a need for automated methods and systems for employment candidate recruitment, pre-screening, scheduling, testing, tracking, and staffing, with targeted functionality in recruiting for and filling high volume non-exempt positions.

Commercially available applicant tracking systems bring in applicants' resumes, for example, by email, by fax, via the web, or in paper format. In such systems, most resumes are received by the applicant tracking system in electronic form, and when a resume is received in fax or paper format, it is converted to an electronic text file by the tracking system using optical character recognition (OCR). A potential problem arises, for example, when an applicant submits his/her resume more than once, and as a result, the particular applicant has duplicate resumes in the applicant tracking system. Currently, commercially available applicant tracking systems are not effective in handling such duplicate resumes. For example, currently available applicant tracking systems can typically deal with duplicate fax or paper format resumes when such duplicates are first received. However, if there are already duplicate resumes in the tracking system, or if resumes are automatically input into a tracking system database directly from a network, such as the Internet, as is typically the case, there is a great potential for problems with duplicate resumes with which currently available applicant tracking systems cannot cope. Assume, for example, that an applicant submits his/her resume for ten different positions. In that case, there are potentially ten different versions of the applicant's resume in a currently available applicant tracking system. Thus, there is a current need for a method and system of applicant resume data management that identifies and merges duplicate resume information in a resume tracking system to create a single unique resume in the tracking system that combines all of the relevant applicant information from the different versions of the applicant's resume.

SUMMARY OF THE INVENTION

It is a feature and advantage of the present invention to provide a method and system for employment candidate data management with targeted functionality for recruitment, pre-screening, and scheduling for high volume non-exempt positions.

It is another feature and advantage of the present invention to provide a method and system for employment candidate data management with targeted functionality for tracking, testing, and staffing for high volume non-exempt recruiting.

It is a further feature and advantage of the present invention to provide a method and system for employment candidate data management that identifies and merges duplicate resume information to create a single unique resume.

To achieve the stated and other features, advantages and objects, a recruitment, pre-screening, and scheduling aspect of the present invention facilitates the screening of high volume operations positions for candidates for employment, utilizing a website facility for candidates to go through a pre-screen. For candidates who successfully complete the pre-screen, additional information is taken and pre-employment tests are scheduled via the website. In the recruitment, pre-screening, and scheduling aspect, an interne application allows candidates to view brief descriptions of commonly available entry-level operations positions, leave basic personal information, go through a pre-screen and, if successfully completing the pre-screen, schedule themselves for a pre-employment testing session or interview. The application can be hosted either on a server of a potential employer or by a third party hosting service and allows recruiters more control over opening and/or closing positions, setting testing and/or interview schedules, and also enhances reporting.

A tracking, testing, and staffing aspect of the invention provides a candidate tracking, testing and staffing application that is targeted, for example, at high-volume, non-exempt hiring which handles the candidate screening process for the actual test administration and actually performs screening of a candidate's paper-based, official employment application. Further, the system of the present invention also handles interviews, provides hiring pool management, job offer support, and scheduling of training classes for new employees and is integrated with an applicant tracking system. A resume data management aspect of the invention utilizes computer hardware and software to automatically identify and merge duplicate resume information in a resume tracking system to create a single unique resume in the tracking system that combines all of the relevant applicant information from different versions of an applicant's resume in the tracking system.

An embodiment of the invention provides a method and system for managing employment candidate data utilizing a pre-screen application running at least on part on a server coupled via a network to a terminal that is pre-programmed, for example, for allowing an employment candidate at the terminal to log on to a pre-screen application website and optionally enter a selection for an employment position of interest to the candidate. The pre-screen application displays a list of employment positions and employment position descriptions for the candidate on a positions GUI screen with a designation of which of the employment positions are currently available and which are currently unavailable and prompts the candidate to enter the selection. If the employment position of interest to the candidate is currently unavailable, the candidate is redirected to another website with an explanation of how to use the other website functionality, for example, receive notification once the currently unavailable employment position becomes available.

The pre-screen application for an embodiment of the invention is also pre-programmed for allowing the candidate to enter personal information on a personal information GUI screen, as well as responses to a list of pre-screen questions on a questionnaire GUI screen, if the candidate enters the selection for the employment position of interest. Provided the candidate enters a response to every question on the list of pre-screen questions, the candidate is scored, for example, as pre-screen qualified, pre-screen not qualified, or pre-screen qualified prior employee via the pre-screen application based on the candidate's responses to the list of questions. If the candidate is scored as pre-screen not qualified, the candidate is directed to a soft decline GUI page via the pre-screen application, and if the candidate is scored as pre-screen qualified prior employee, the candidate is directed to a prior employee GUI page with further instructions via the pre-screen application. However, if the candidate is scored as pre-screen qualified, the candidate is allowed an option to enter a selection to schedule either or both of a pre-employment test or a pre-employment interview via the pre-screen application. In that case, a schedule GUI screen is displayed for the candidate showing open slots for future pre-employment tests and pre-employment interviews via the pre-screen application. If the candidate is unable to schedule a convenient date, the candidate is allowed an option to enter a decline to schedule presently, and directions are displayed for the candidate for re-scheduling at a later time via the pre-screen application.

A tracking and testing application for an embodiment of the invention running at least in part on a server coupled over a network to a local terminal is pre-programmed, for example, for receiving electronically scannable employment qualification test data and candidate-supplied application information for the candidate via an optical scanning device associated with the local terminal. The candidate is allowed to complete a scannable employment qualification test and candidate-supplied application information form which is then scanned into the system via the optical scanning device. The tracking and testing application is pre-programmed to generate an employment qualification score for the candidate as either qualified or not qualified for employment based at least in part on the employment qualification test data. The test data is aggregated and stored in a local database associated with the local terminal, and the aggregated test data and candidate-supplied application information are sent over the network to a centralized database associated with the server via the testing and tracking application. In addition, the testing and tracking application is pre-programmed to print out either a qualified or a non-qualified for employment letter for the candidate based at least in part on the employment qualification score.

In the testing and tracking aspect for an embodiment of the invention, a staff member at a staff terminal coupled to the server over the network is allowed to enter a positive response on a meets requirements field of a pre-screen GUI screen with respect to the candidate if the candidate meets pre-defined minimum employment requirements based on the candidate-supplied application information, which is displayed for the staff member on the pre-screen GUI screen via the testing and tracking application. Thereafter, an interviewer is allowed to enter a recommendation for hiring the candidate on a recommendation field of a candidate interview GUI screen based on an interview of the candidate according to a matrix of pre-defined interview questions displayed for the interviewer via the testing and tracking application. During the interview, the interviewer is prompted to ask the candidate to respond to the questions for each of a number of competency categories displayed for the interviewer on a dimensions field of a candidate interview GUI screen. The interviewer is allowed options to enter a rating for the candidate as more than acceptable, acceptable, or less than acceptable for each of a number of categories displayed in the dimensions field based on the candidate's responses to the questions. As alternatives to the recommendation for hiring the candidate, the interviewer is also allowed to enter recommendations for referring the candidate to another position or declining the candidate on the recommendation field of the candidate interview GUI screen.

In addition, the testing and tracking application for an embodiment of the invention is pre-programmed for allowing a user to enter a selection to make an offer to the candidate in an extend offer field of a candidate pool GUI screen based on a ranking of the candidate in a candidate pool displayed on the candidate pool GUI screen via the testing and tracking application. The candidate pool displayed for the user shows the candidate ranked among other candidates on one or more pre-selected criteria established for one or more employment positions. These criteria include, for example, test scores, interview results, prior experience, and an overall ranking for the candidate via the testing and tracking application. If the user enters the selection to make an offer, an offer GUI screen is displayed for the user showing a predetermined salary rate based on the candidate's experience and position in which the candidate is interested, and the user is allowed to offer the position to the candidate at the particular salary rate. If the candidate accepts the offer, the user is allowed to proceed, for example, with one or more of generating an offer letter, placing the candidate in an employees for future hire category, turning the candidate over to a staffing tracking system, or assigning the candidate to a training class. If the candidate is assigned to a training class, the testing and tracking application is also pre-programmed for allowing the candidate to enter information on a training class maintenance GUI screen to change from the assigned training class to another training class.

In the resume data management aspect for an embodiment of the invention, a resume tracking application running at least on part on a server coupled to a terminal via a global resource network is pre-programmed for electronically storing resumes for a number of employment candidates. Each resume includes information, such as the candidate's surname, first name, postal zip code, address, and/or phone number, that is likely to be associated exclusively with only one of the employment candidates. A search functionality of the resume tracking application is pre-programmed to compare the stored resumes with one another according to predefined parameters based on the information that is likely to be associated exclusively with one of the employment candidates. If such information is identified by the search functionality in more than one of the stored resumes, a list of resumes that contain the identified information is displayed on a resume list GUI screen for the user via the resume tracking application, and the user is allowed to view and compare the resumes that contain the identified information side-by-side on a compare GUI screen via the resume tracking application. Based on the comparison, the user is allowed to enter a selection to merge resumes in which the information is identified but which are not identical duplicates or to delete all but one of the resumes in which the information is identified and the resumes are duplicates.

Additional objects, advantages and novel features of the invention will be set forth in part in the description which follows, and in part will become more apparent to those skilled in the art upon examination of the following, or may be learned from practice of the invention.

BRIEF DESCRIPTION OF THE DRAWINGS

FIG. 4 shows an example of a personal information GUI screen for the recruitment, pre-screening, and scheduling aspect of an embodiment of the invention;

FIG. 6 shows an example of a questionnaire GUI screen for the recruitment, pre-screening, and scheduling aspect of an embodiment of the invention;

FIG. 13 shows an example of an 'application pre-screen' GUI screen for the testing, tracking, and staffing aspect of an embodiment of the invention;

FIG. 18 shows an example of a 'candidate pool' GUI screen for the testing, tracking, and staffing aspect of an embodiment of the invention;

FIG. 22 shows an example of the resume list GUI screen displaying the list of possible duplicate resumes for the resume data management aspect of an embodiment of the invention;

DETAILED DESCRIPTION

Referring now in detail to embodiments of the present invention, examples of which is illustrated in the accompanying drawings, an aspect of the present invention provides a method and system, for example, for facilitating the screening of high volume operations positions for candidates for employment. It provides, for example, a website facility for candidates to go through a pre-screen. If they successfully complete the pre-screen, the information for them is taken, pre-employment tests are scheduled, and they are given information, for example, about how to get to another relevant website. An important feature of an embodiment of the invention is that it is specifically enhanced or designed to handle high volume type positions, for which an employer recruits on a regular basis. An embodiment of the invention integrates, for example, the scheduling process, such as scheduling of pre-employment tests or interviews.

A major feature of the recruitment, pre-screening, and scheduling aspect of the invention allows a candidate to look at jobs and select a job of interest and to leave basic personal information. For example, in viewing a job, a candidate can view a list of commonly available jobs. The candidate can distinguish which jobs are currently open and which are not currently available, although with operations jobs, there are generally positions available for which candidates can apply. In a particular instance where a position is not currently available, instead of removing the position from the website, a notice is posted advising that candidates are not currently being hired for the position, and candidates are redirected to select another position. An embodiment of the invention adapts and integrates a job engine functionality. Once candidates select a position in which they are interested, they can leave basic information, such as name, social security number, home address, and the like.

Figure 1:
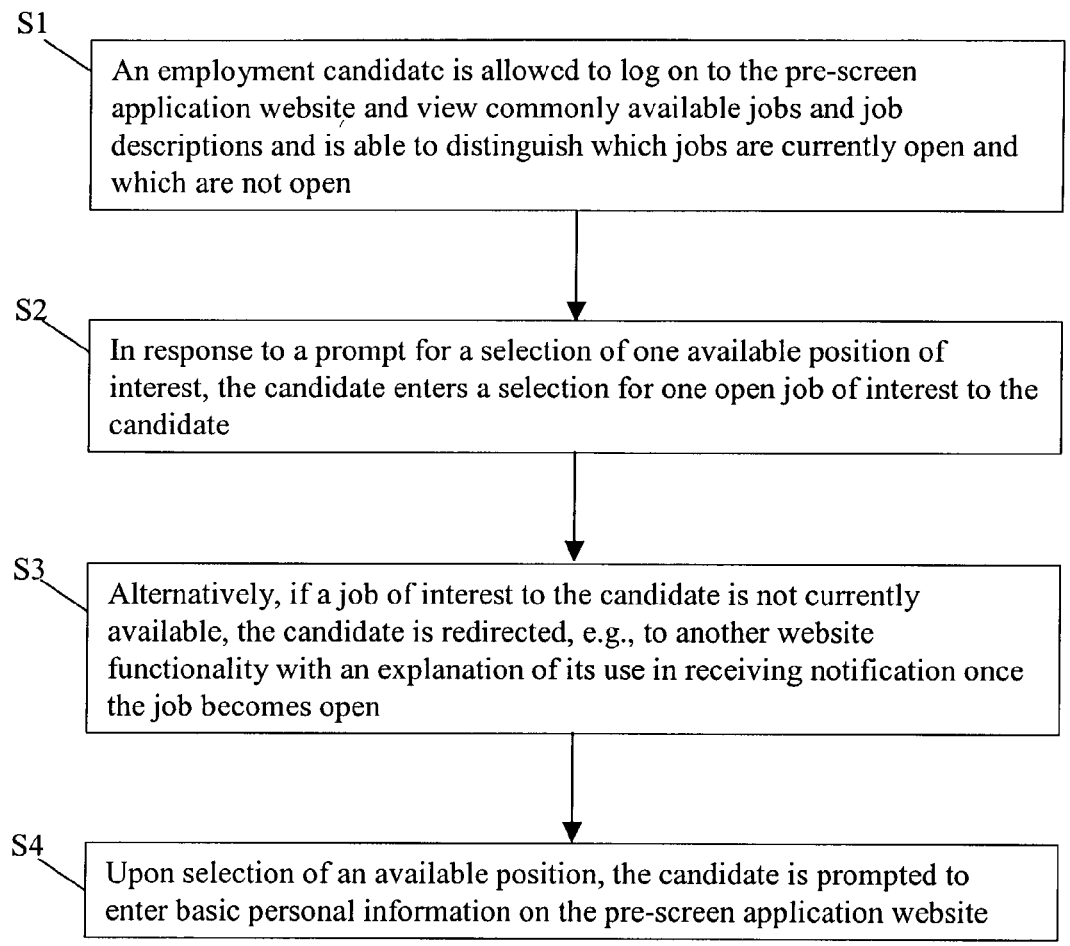
FIG. 1 is a flow chart that illustrates an example of the process of selecting an available position of interest by a candidate in the recruitment, pre-screening, and scheduling aspect of an embodiment of the invention.
Figure 2:
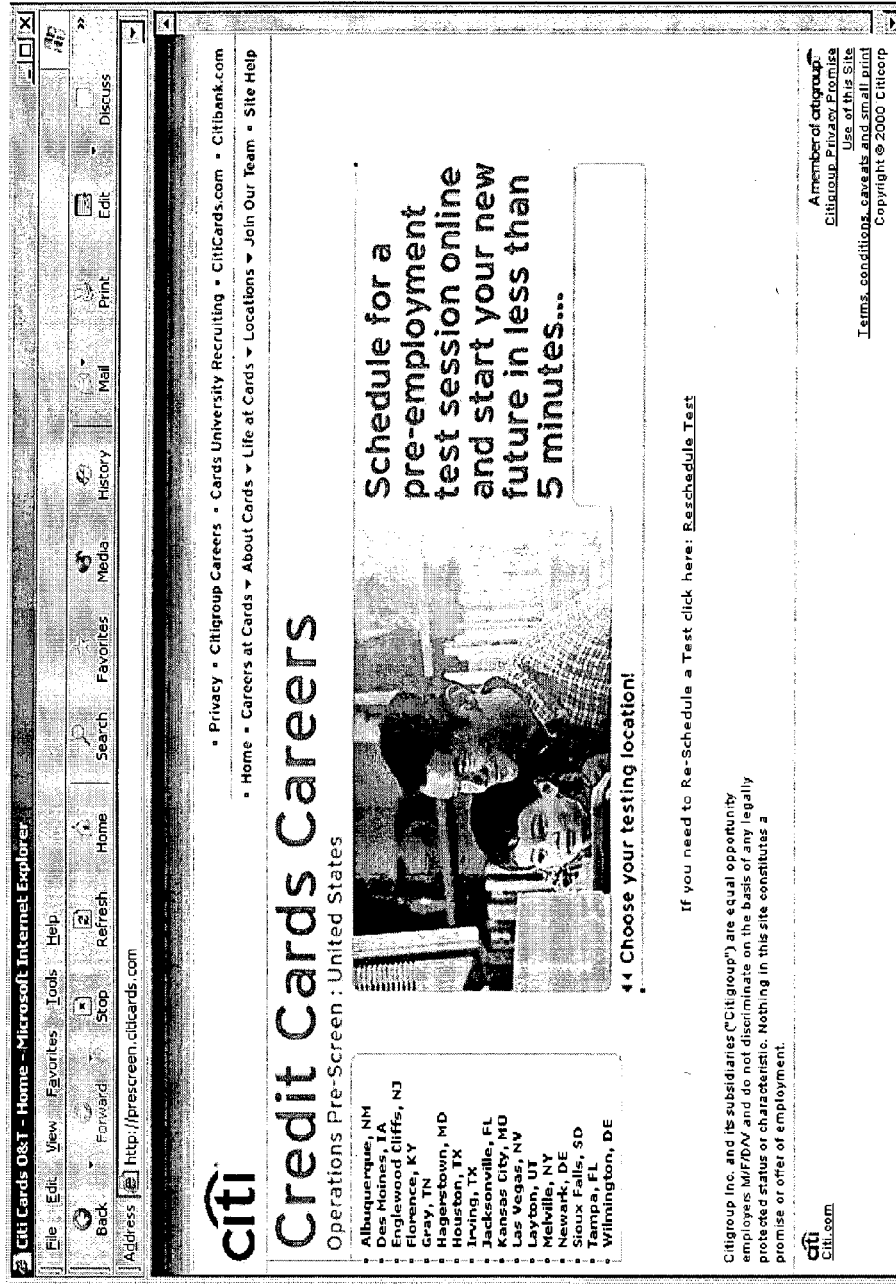
FIG. 2 shows an example of the pre-screen application website logon GUI screen for the recruitment, pre-screening, and scheduling aspect of an embodiment of the invention.
Figure 3:
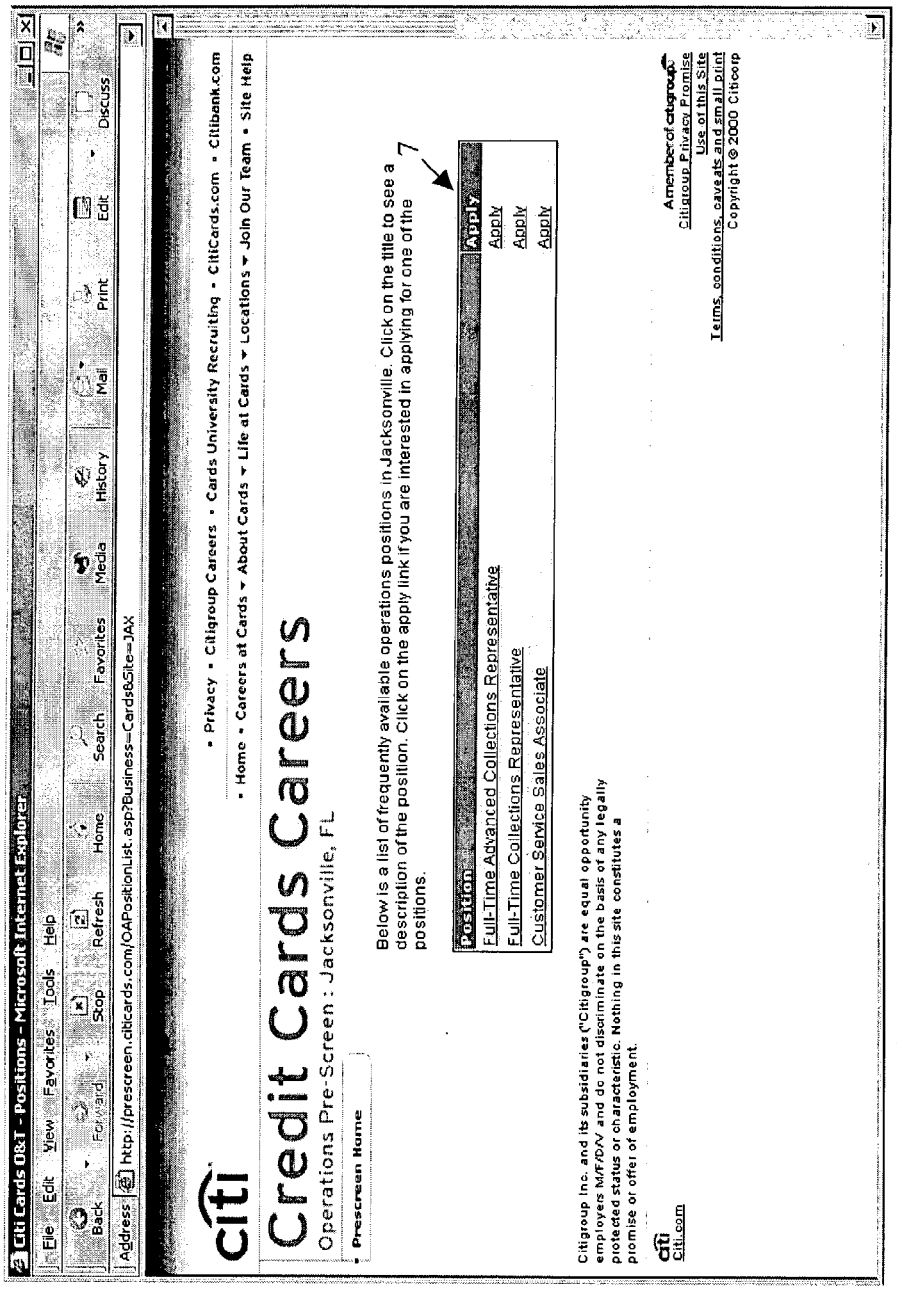
FIG. 3 shows an example of a positions GUI screen for the recruitment, pre-screening, and scheduling aspect of an embodiment of the invention.
Figure 4:
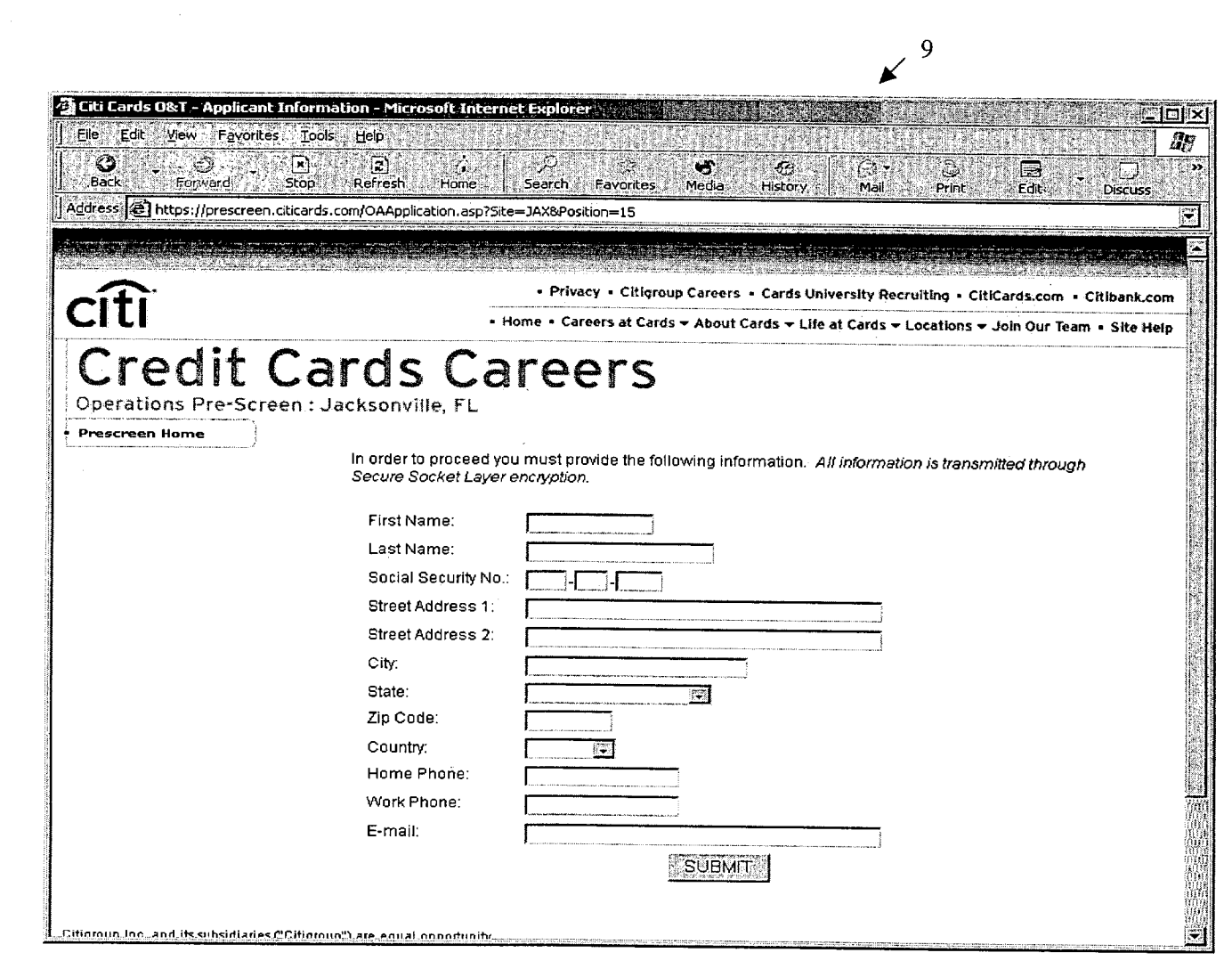

FIG. 1 is a flow chart that illustrates an example of the process of selecting an available position of interest by a candidate in the recruitment, pre-screening, and scheduling aspect of an embodiment of the invention. Referring to FIG. 1, at S1, the employment candidate is allowed to log on to the pre-screen application website, an example GUI screen 3 for which is shown in FIG. 2 for an embodiment of the invention, and view commonly available jobs and job descriptions on a positions GUI screen 5, an example of which is shown in FIG. 3 for an embodiment of the invention, and is able to distinguish which jobs are currently open and which are not open. At S2, in response to a prompt for a selection of an available position of interest, the candidate is allowed to enter a selection for one open job of interest to the candidate by clicking on an apply button 7 on the positions GUI screen 5. Alternatively, at S3, if a job of interest to the candidate is not currently available, the candidate is re-directed, for example, to another website functionality with an explanation of its use in receiving notification once the job becomes open. At S4, upon selection of an available position, the candidate is taken to a personal information GUI screen 9, an example of which is shown in FIG. 4 for an embodiment of the invention, and prompted to enter basic personal information on the personal information GUI screen 9 of the pre-screen application website.

Thereafter, a candidate goes through a basic pre-screening process, which asks questions such as, 'Are you 18 years of age or older?'; 'Are you eligible to work in the US?'; 'Will you work in this kind of environment?'; and/or 'Will you work for this range of pay?'. Candidates are asked very basic screening questions, so that candidates can opt or self-select out or be screened out, for example, if they are not interested in working in the particular environment and/or for the particular money. The pre-screen questions for the recruitment, pre-screening, and scheduling aspect of an embodiment of the invention are also customizable, for example, by site or position, so that different questions can be asked for the same position at different sites. Further, the questions can be customized to specify which questions require answers or whether a 'yes' or 'no' answer is required, or customized with specific text or options. In addition, the job listings can be customized, for example, by site and/or function, and the like.

Figure 5:
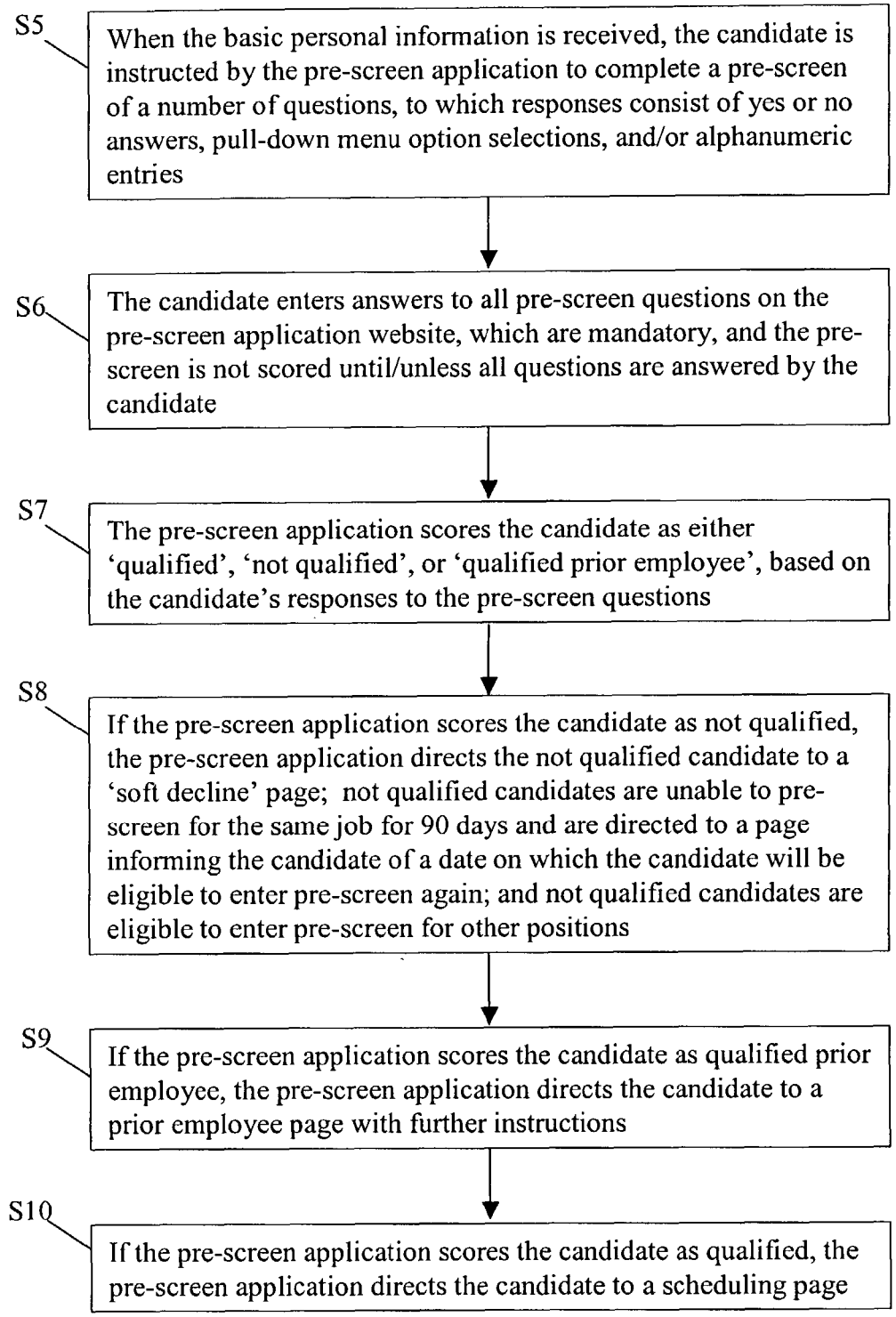
FIG. 5 is a flow chart that illustrates an example of the basic pre-screen process for the recruitment, pre-screening, and scheduling aspect of an embodiment of the invention.

FIG. 5 is a flow chart that illustrates an example of the basic pre-screen process for the recruitment, pre-screening, and scheduling aspect of an embodiment of the invention. Referring to FIG. 5, at S5, when the basic personal information is received from the candidate on the personal information GUI screen 9 of the pre-screen application website, the candidate taken to a questionnaire GUI screen 11, an example of which is shown in FIG. 6 for an embodiment of the invention, and is instructed by the pre-screen application to complete a pre-screen of a number of questions, to which responses consist of 'yes' or 'no' answers, pull-down menu option selections, and/or alphanumeric entries. At S6, the candidate enters answers to all pre-screen questions on the questionnaire GUI screen 11 of the pre-screen application website, which are mandatory, and the pre-screen is not scored until/unless all questions are answered by the candidate. At S7, the pre-screen application scores the candidate as either 'qualified', 'not qualified', or 'qualified prior employee', based on the candidate's responses to the pre-screen questions.

Figure 7:
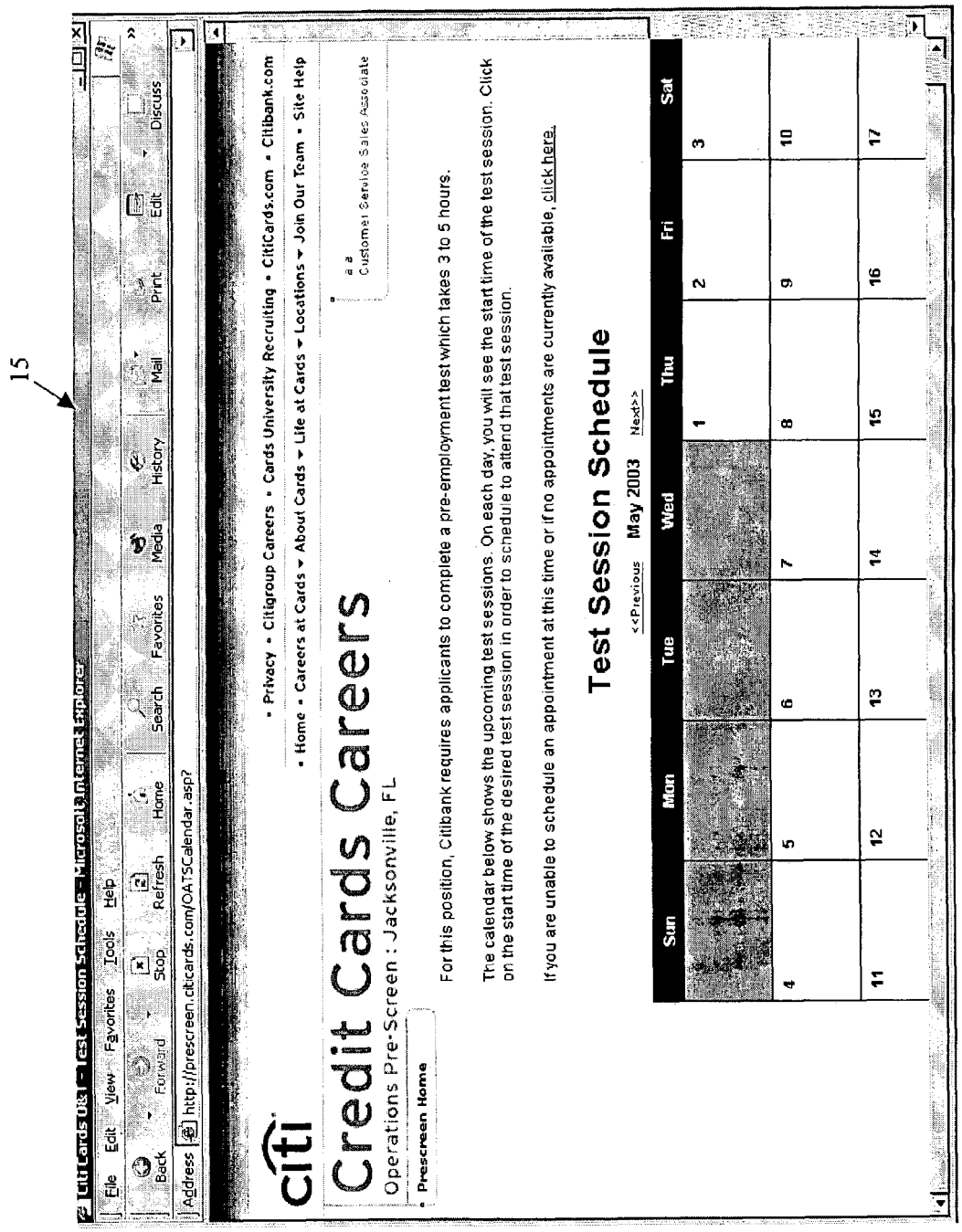
FIG. 7 shows an example of the candidate scheduling GUI page for the recruitment, pre-screening, and scheduling aspect of an embodiment of the invention.

Referring further to FIG. 5, if the pre-screen application scores the candidate as not qualified, at S8, the pre-screen application directs the not qualified candidate to a 'soft decline' page. Not qualified candidates are unable to pre-screen for the same job for a pre-determined time, such as 90 days, and are directed to a page informing the candidate of a date on which the candidate will be eligible to enter pre-screen again. However, not qualified candidates are immediately eligible to enter pre-screen for other positions. Alternatively, at S9, if the pre-screen application scores the candidate as a qualified prior employee, the pre-screen application directs the candidate to a prior employee page with further instructions. On the other hand, if the pre-screen application scores the candidate as qualified, at S10, the pre-screen application directs the candidate to a scheduling GUI page 15, an example of which is shown in FIG. 7 for an embodiment of the invention.

Figure 8:
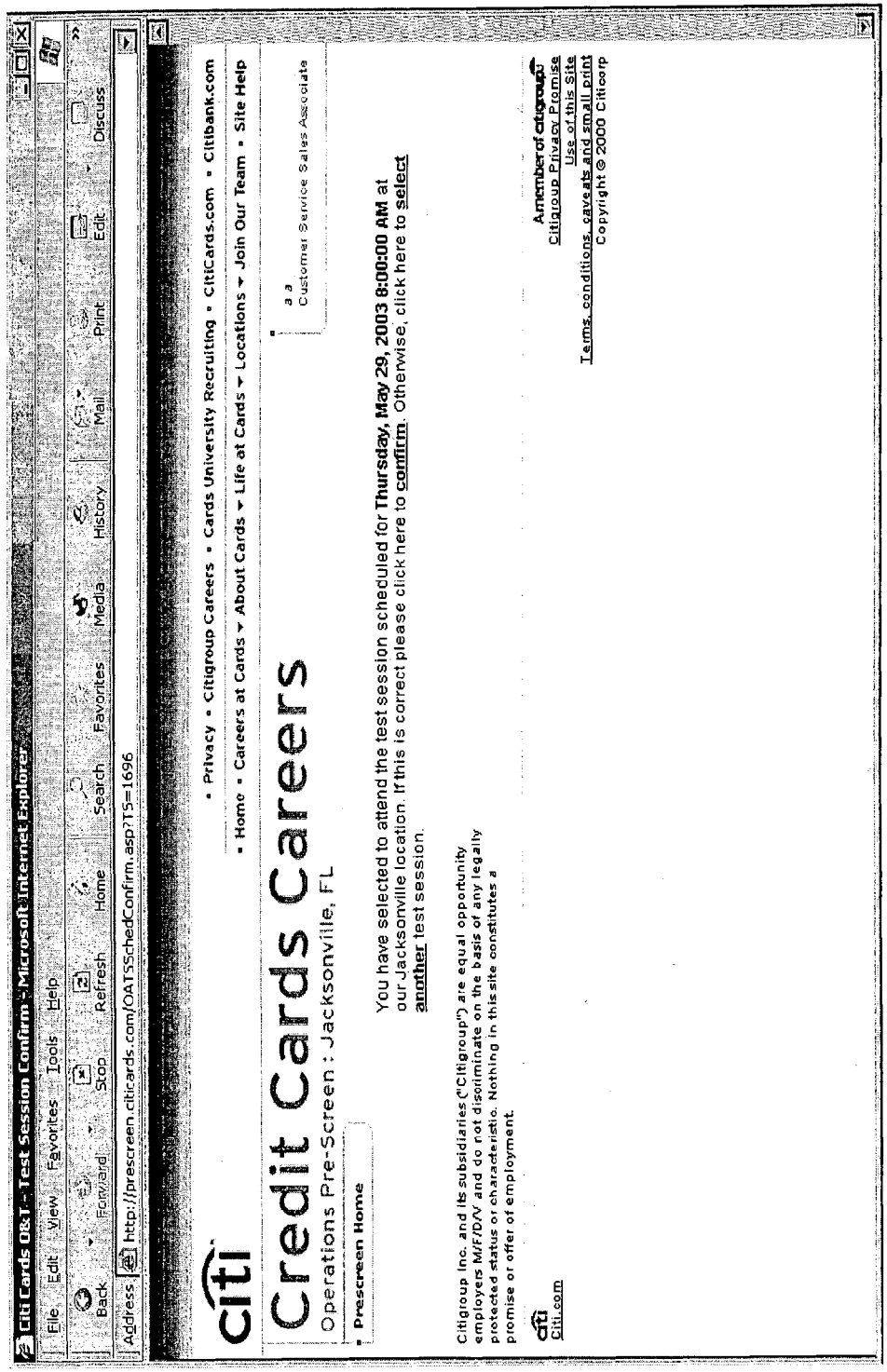
FIG. 8 shows an example of a scheduling calendar GUI screen for the recruitment, pre-screening, and scheduling aspect of an embodiment of the invention.
Figure 9:
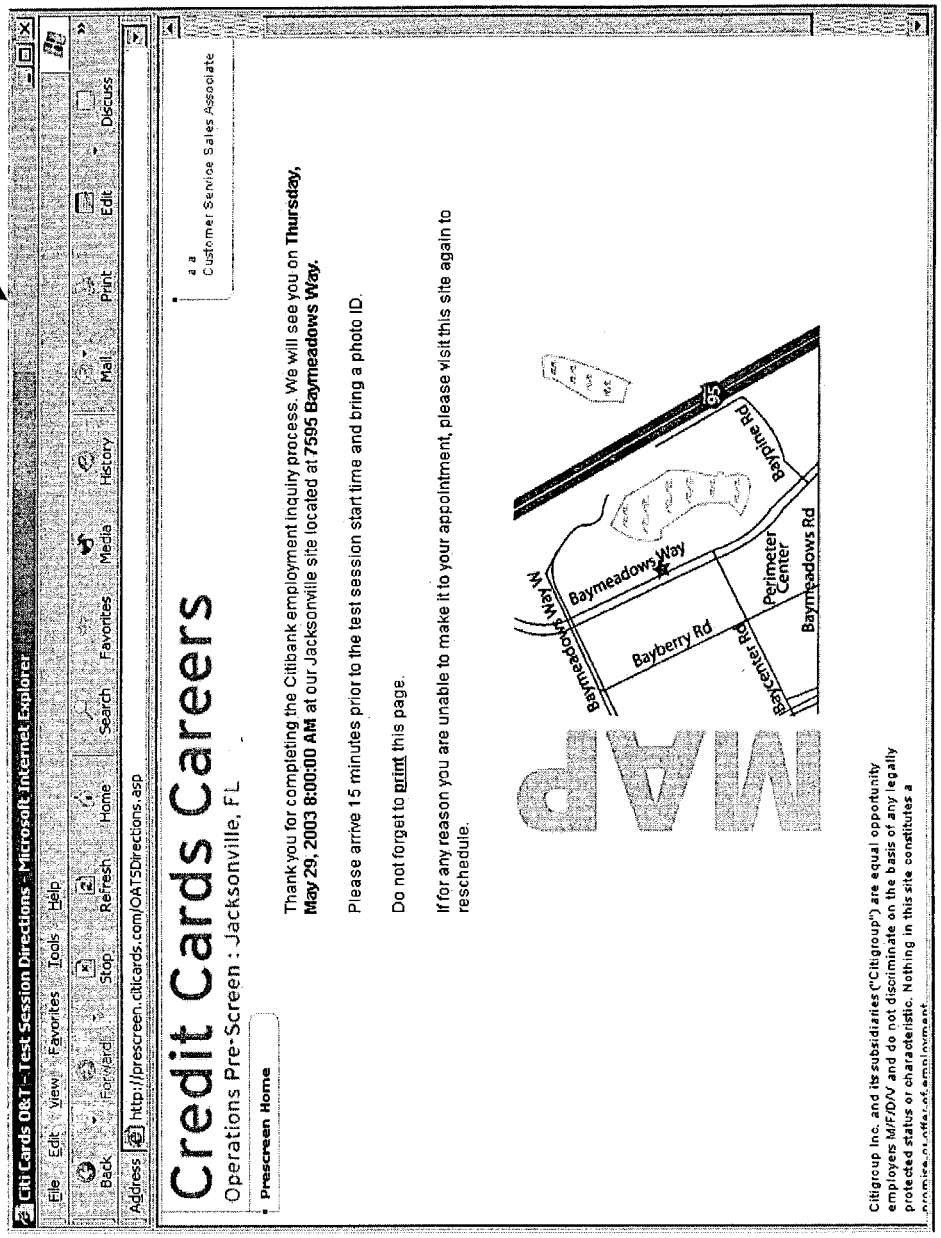
FIG. 9 shows an example of a directions GUI screen for the recruitment, pre-screening, and scheduling aspect of an embodiment of the invention.

Once a candidate passes through the pre-screen, assuming that the candidate passes the pre-screen questionnaire, the candidate is eligible to be scheduled for a pre-employment test or for a hiring session to come in and take an exam. A scheduling functionality displays a calendar on the scheduling GUI screen 15 for the applicant, an example of which is shown in FIG. 8 for an embodiment of the invention, that shows the candidate all of the available dates. The candidate can click on a selection for a particular class or to enroll into a test session on the scheduling GUI screen 15, and the candidate is given directions and maps instructing the candidate how to reach the appropriate site on a directions GUI screen 17, an example of which is shown in FIG. 9 for an embodiment of the invention. In addition, a reschedule feature allows the candidate to reschedule if, for some reason, the candidate cannot attend the originally scheduled session.

Figure 10:
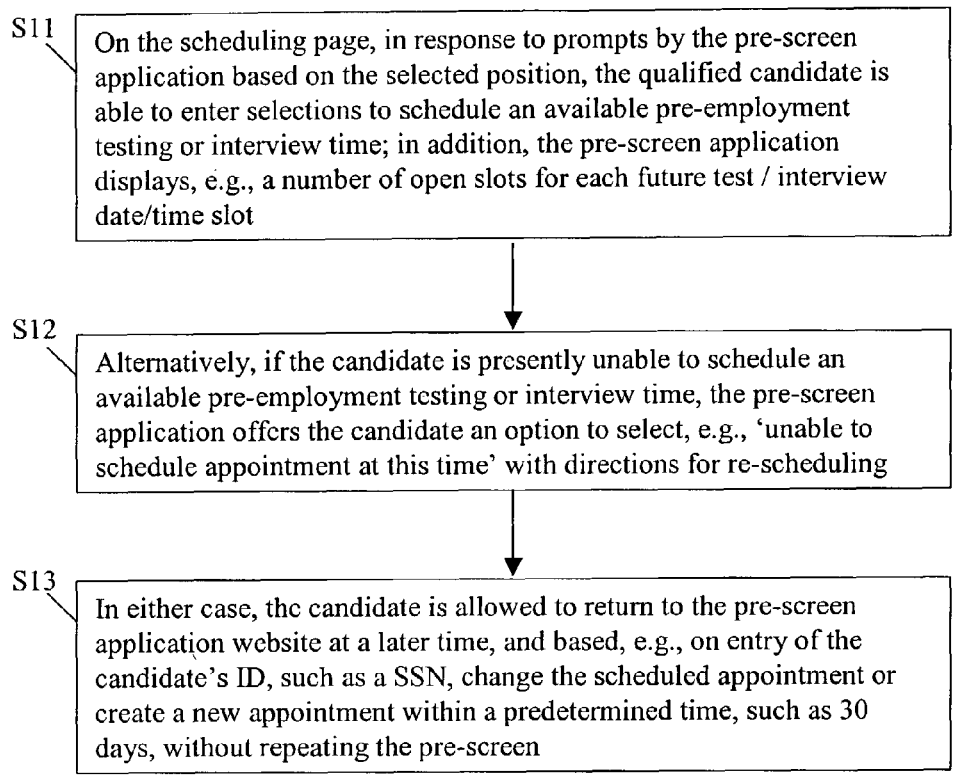
FIG. 10 is a flow chart that illustrates the process of scheduling and/or rescheduling for the recruitment, pre-screening; and scheduling aspect of an embodiment of the invention.

FIG. 10 is a flow chart that illustrates the process of scheduling and/or rescheduling for the recruitment, pre-screening, and scheduling aspect of an embodiment of the invention. Referring to FIG. 10, at S11, in response to prompts by the pre-screen application based on the selected position, the qualified candidate is able to enter selections to schedule an available pre-employment testing or interview time on the scheduling GUI screen 15. In addition, the pre-screen application displays, for example, a number of open slots for each future test/interview date/time slot. Alternatively, at S12, if the candidate is presently unable to schedule an available pre-employment testing or interview time, the pre-screen application offers the candidate an option to select, for example, 'unable to schedule appointment at this time' with directions for re-scheduling. In either case, at S13, the candidate is allowed to return to the pre-screen application website at a later time, and based, for example, on entry of the candidate's ID, such as the candidate's SSN, change the scheduled appointment or create a new appointment within a predetermined time, such as 30 days, without repeating the pre-screen process.

A validation functionality of the recruitment, pre-screening, and scheduling aspect, based on predefined business rules, prohibits a candidate who was previously pre-screened for a position but did not qualify, from going through the pre-screen process again for a predetermined period, such as 90 days or six months. The validation functionality utilizes validation checks based, for example, on name and social security number to verify if a candidate already pre-screened in the past. It also retains a record of prior candidate tests and checks to see if a candidate tested in the past. If the candidate does not pass the pre-screen questionnaire, the candidate is shown a screen thanking the candidate for his or her interest in the company and notifying the candidate that others are more qualified at this time.

Another feature of the recruitment, pre-screening, and scheduling aspect of the invention is a maintenance functionality that is hosted, for example, at the employer's site. The maintenance functionality utilizes, for example, the Internet and extensible markup language (XML) to update pre-screen information, so that recruiters are able to access the maintenance functionality from their desktops and update the information on a remote server that hosts the pre-screen application. The recruiters or staffing people in a human resources (HR) department can update which positions are currently open, and they can view the candidates that are currently scheduled for test sessions. Staff personnel can also add new pre-screen questions, new positions, sites, etc. locally and have the information updated on the remote server.

It is noted that application for the recruitment, pre-screening, and scheduling aspect of the invention is made available to candidates, for example, via the Internet. On the other hand, the administrative functionality available to in-house recruiters is hosted locally on an intranet, but it communicates seamlessly via the Internet website. The staffing personnel can access the maintenance functionality that is housed on the intranet and view a list of their currently scheduled test sessions. They can see how many openings there are in a particular test session and how many are currently filled. The staffing personnel can also click on a screen and bring up a report that lists the candidates who have scheduled for the particular test session with the names and phone numbers of the candidates, so they can contact the candidates if necessary.

A question that is asked of candidates on the questionnaire GUI screen 11 shown in FIG. 6, for example, is whether they are previous employees of the employer or one of its affiliates. The purpose of asking that question is that certain previously employed candidates may not necessarily be required to test. An embodiment of the invention utilizes guidelines or business rules based on previous employment and allows previously employed candidates to be grandfathered through the testing process. If a candidate pre-screens and enters a selection that the candidate is a previous employee, additional information is captured about the candidate, such as the company by whom the candidate was previously employed, the reason for termination, and further information that enables a recruiter to determine whether or not the candidate requires testing. If the candidate does require testing, the recruiter can schedule the candidate for a test session or inform the candidate to go back online and schedule a test session.

The tests are administered in groups, and once a particular test session is full, the scheduling functionality for an embodiment of the invention "grays out" the link. It still shows the session on the calendar, but it is grayed out, so candidates cannot click on to schedule for the particular test session. However, the report functionality allows "overbooking" to occur, similar to airline overbooking, because typically there are significant "no-shows". Each site and each market is different regarding the percentage of no-shows, so the rate of overbooking allowed for a particular site is determined on the basis of historical experience. Key features of the recruitment, pre-screening, and scheduling aspect of an embodiment of the invention involve integration of various hardware and software tools and optimization for high volume, non-exempt operations positions and elimination of the use, for example, of VRU systems which are extremely expensive.

The testing, tracking, and staffing aspect of the invention is likewise targeted, for example, at high-volume, non-exempt hiring. This aspect employs computer modules, for example, for pre-employment test administration, employment application screening, interview results, hiring pool management, job offer support, and training class management. A testing, tracking, and staffing application handles the candidate screening process for the actual test administration and performs screening of a candidate's paper-based, official employment application. In addition, the application handles interviews, provides hiring pool management, job offer support, and scheduling of training classes for new employees. Further, the testing, tracking, and staffing application is integrated with an applicant tracking system.

The testing, tracking, and staffing aspect of the invention utilizes, for example, an intranet based component and a test component that reads candidates' paper tests. The tests themselves are scannable tests, on which test takers bubble-in their answers with a pencil mark. A scannable test is simply a test document with fields that can be read electronically and that hold information in the form, for example, of handwriting, mark recognition, machine print, bar codes, and images. The test can be supplied, for example, by a third party vendor and validated to ensure that there is no adverse impact on protected groups or the like and that candidates are not screened out that should not be screened out. In this aspect, the system utilizes, for example, an optical mark scanner to read the bubbled-in pencil marks on a battery of tests. In addition, the system scores the tests and prints out qualified or non-qualified letters.

The process for this aspect requires, for example, roughly two and one-half to three hours to complete, from gathering a group of a predetermined number people in a room, to getting them through the number of tests in the battery, to having them go through an interview, and if applicable, to actually concluding with a hire. Thus, the testing, tracking, and staffing aspect of the invention enables a job applicant to be offered a job and be scheduled for his or her first training class within three hours after walking in the door. A significant advantage is that once the candidates are gathered together in a room for testing, it avoids a possibility that they will leave and be hired by someone else. Another significant advantage is that the process is flexible. Although the process can be completed within three hours, it is flexible enough to be broken up at certain stopping points, if there is reason to extend the process, for example, over a few days.

Figure 11:
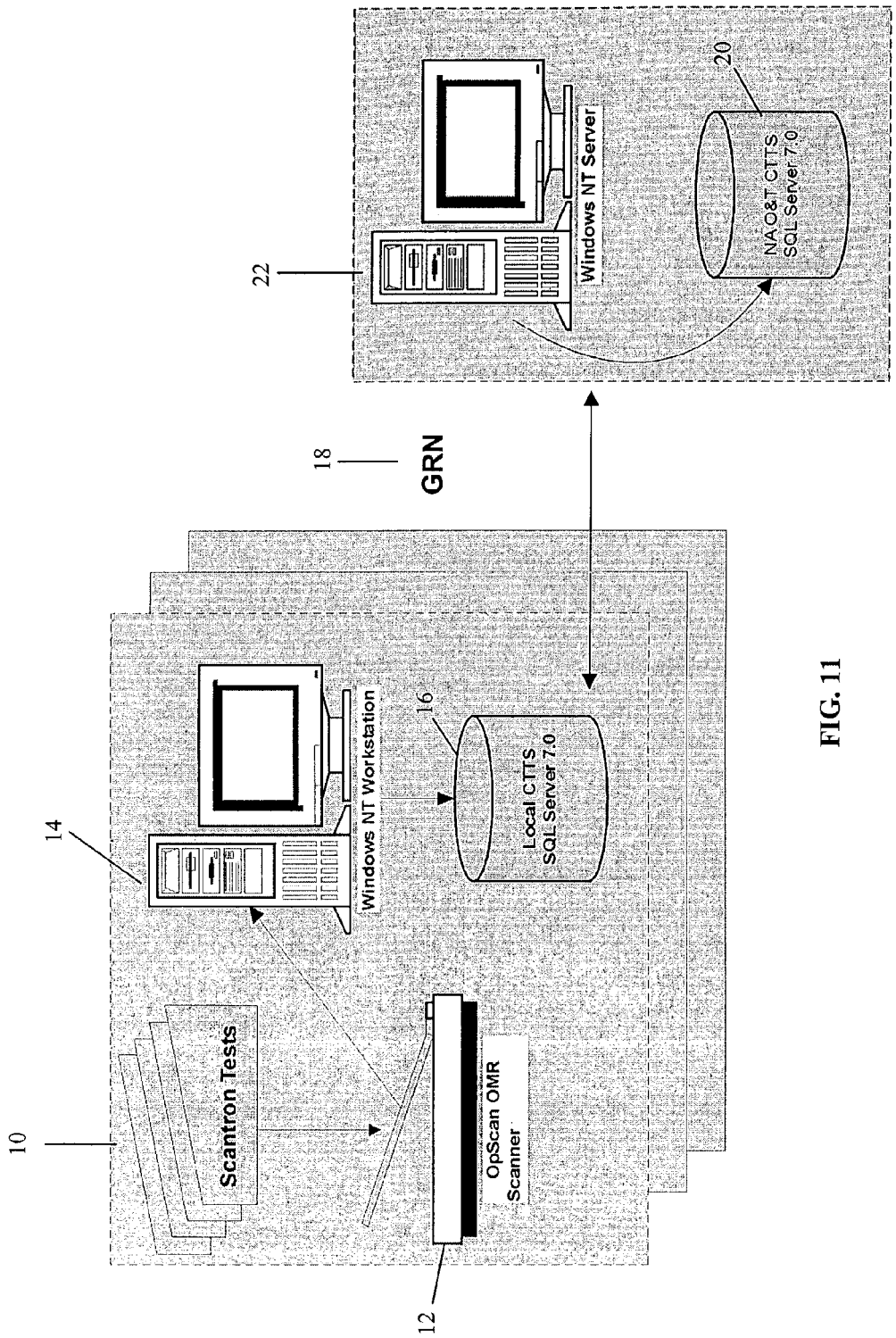
FIG. 11 is a schematic diagram that shows an example overview of key components and the flow of information between the key components of the testing, tracking, and staffing aspect for an embodiment of the present invention.

The test component for the testing, tracking, and staffing aspect actually performs the testing or compilation, the scanning of scannable items, the scoring of tests, and the printing of standard letters for qualification and non-qualification. FIG. 11 is a schematic diagram that shows an example overview of key components and the flow of information between the key components of the testing, tracking, and staffing aspect for an embodiment of the present invention. Referring to FIG. 11, the scannable tests 10 are manual, paper tests that a candidate takes. The scannable paper tests 10 are handed in and scanned by an optical mark reader (OMR) 12 coupled to a local terminal 14, which reads and scores the tests 10. The scored test information is read and stored in the system, for example, in a local database 16. The test sites can be deployed in many locations over a wide geographic area, and the testing information is sent over a global resource or router network (GRN) 18, that is essentially a wide area network (WAN), to a centralized database 20 coupled to a server 22.

The local database 16 is provided as a contingency in case the GRN 18 is down and cannot connect to the central database 20, so that test sessions can still be performed and the testing information stored locally. Later, when the network 18 comes back up, it can synchronize the information stored in the local database 16 with the central database 20. In normal operations, the interface is directly with the central database 20. For example, in a situation where there are a number of candidates in a room taking a test and the network 18 goes down, the testing session would likely be disrupted without the local database 16. In that situation, the local database 16 enables everyone in the room to be tested and given qualified or non-qualified letters, and the qualified candidates can be scheduled to return for an interview. In other words, the process set up with the paper-based test 10 can be delayed as long as the lights are on. Even if the local work station 14 is down, the test can still be administered. If that happens, it is simply necessary to call back the people that are qualified. In any event, all of the testing information is aggregated and stored locally in the local database 16 and/or stored in the central database 20.

Figure 12:
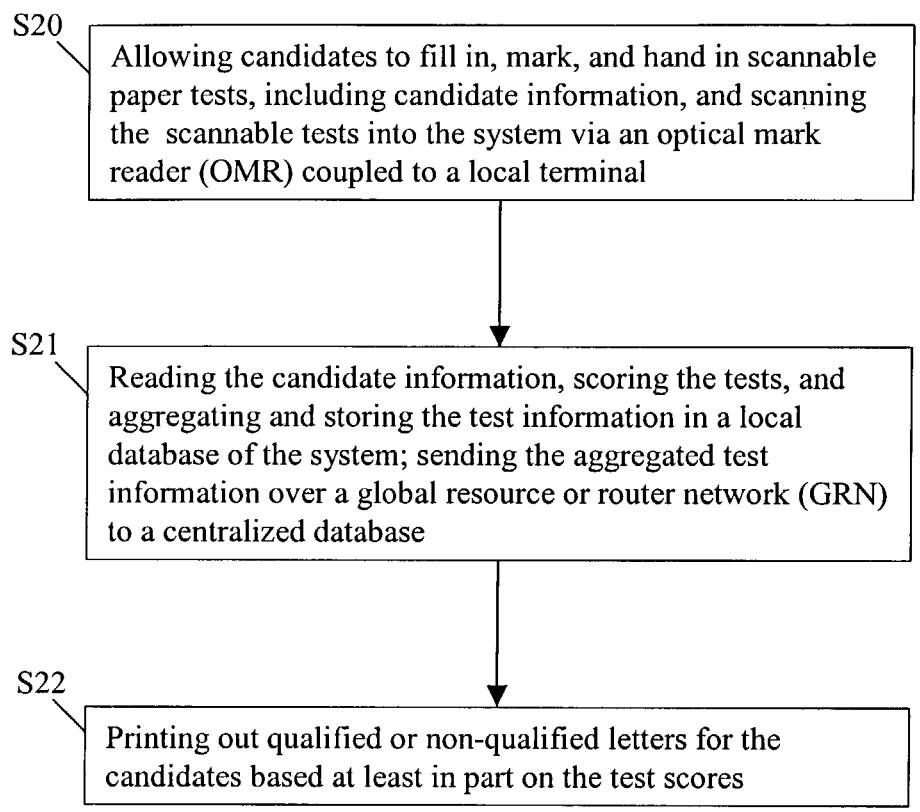
FIG. 12 is a flow chart that illustrates an example of the process of testing, scoring the tests, and printing standard letters for qualification and non-qualification by the test component for the testing, tracking, and staffing aspect of an embodiment of the invention.

FIG. 12 is a flow chart that illustrates an example of the process of testing, scoring the tests, and printing standard letters for qualification and non-qualification by the test component for the testing, tracking, and staffing aspect of an embodiment of the invention. Referring to FIG. 12, at S20, the scannable paper tests are filled in with candidate information, marked and handed in by candidates and scanned into the system by the optical mark reader (OMR) 12 coupled to the local terminal 14. At S21, the system reads the candidate information and reads and scores the tests and aggregates and stores the test information in the local database 16 of the system and also sends the aggregated test information over the GRN 18 to the centralized database 20. At S22, the system prints out qualified or non-qualified letters for the candidates based at least in part on test scores.

Figure 13:
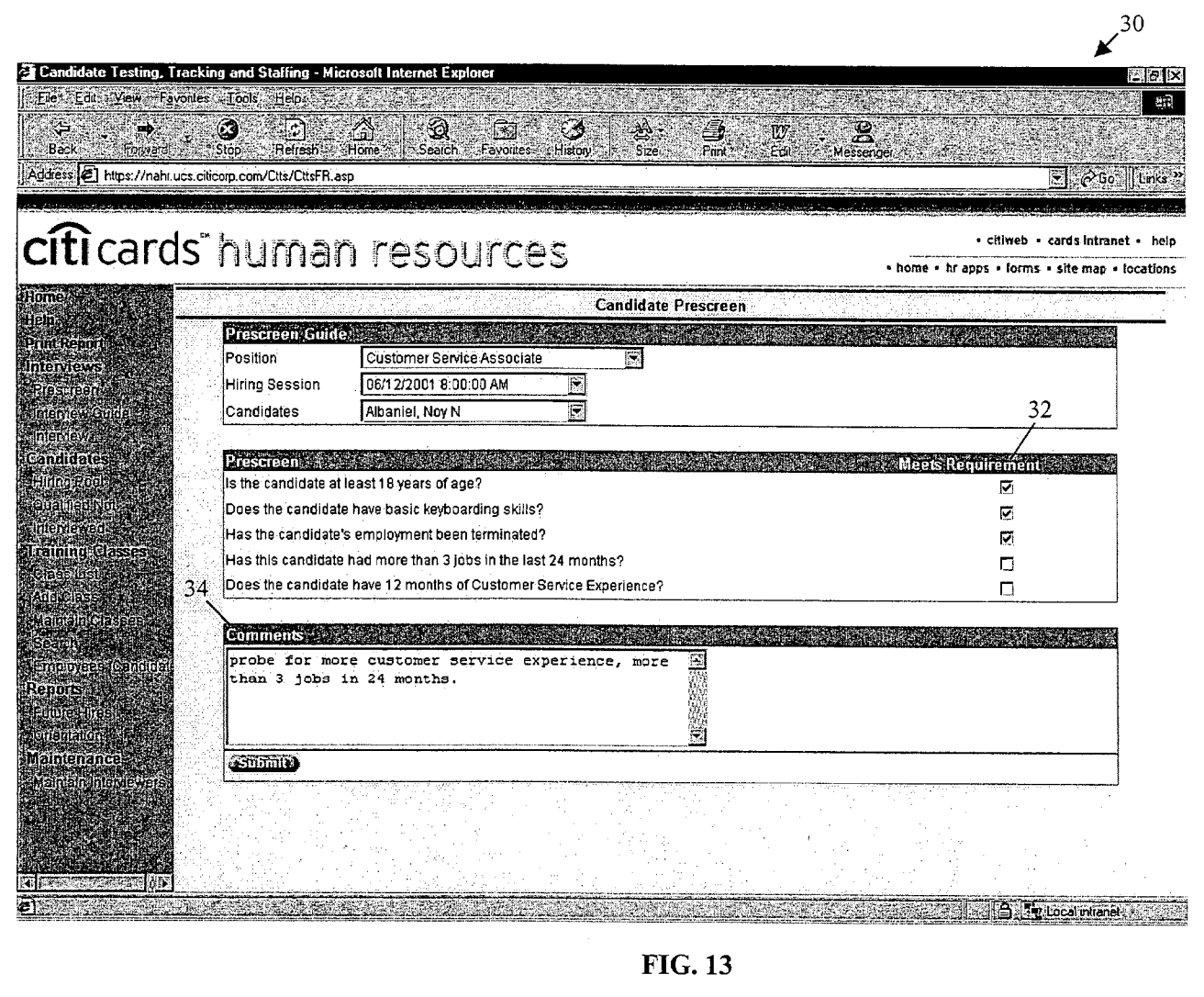

The testing, tracking, and staffing aspect of the invention utilizes a graphical user interface (GUI) for the intranet component for an embodiment of the present invention. FIG. 13 shows an example of an 'application pre-screen' GUI screen 30 for the testing, tracking, and staffing aspect of an embodiment of the invention. Referring to FIG. 13, the pre-screen screen 30 displays information according to a manual application filled in by a candidate. Generally, the purpose of the pre-screen is to verify, for example, that the candidate is at least 18 years of age, whether or not the candidate has a criminal record, and various other information that is required for employment. The pre-screen questions are customizable, for example, by position and site. In addition, a 'meets requirements' field 32 is provided with check boxes, for example, for a staff member in the human resources (HR) department. While the candidates are taking tests, HR staff have the applications that were filled in by the candidates and the applications are reviewed by HR staff for particular things that stand out.

Figure 14:
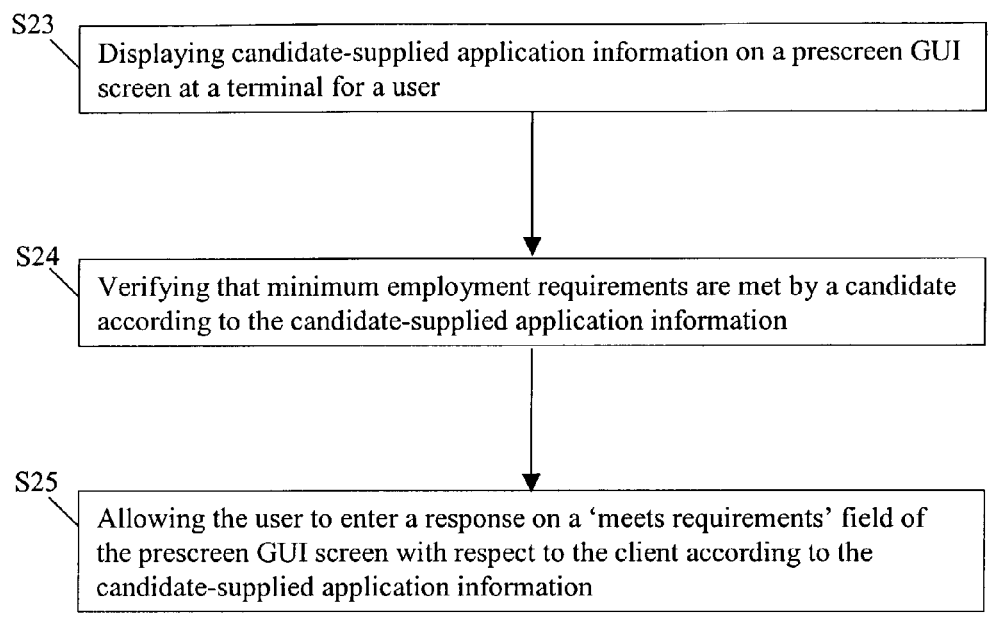
FIG. 14 is a flow chart that illustrates an example of the application pre-screen process of the testing, tracking, and staffing aspect of an embodiment of the invention.

FIG. 14 is a flow chart that illustrates an example of the application pre-screen process of the testing, tracking, and staffing aspect of an embodiment of the invention. Referring to FIG. 14, at S23, candidate-supplied application information is displayed on the 'pre-screen' GUI screen 30 at a terminal for the user. At S24, the user verifies that minimum employment requirements are met by a candidate according to the candidate-supplied application information. At S25, the user is allowed to enter a response on a 'meets requirements' field 32 of the 'pre-screen'GUI screen 30 with respect to the client according to the candidate-supplied application information.

Referring further to FIG. 13, in a 'comments' field 34 of the 'candidate pre-screen' screen 30, HR staff can enter matters about which they want an interviewer to ask for additional information from the candidate. For example, if a candidate has had more than three jobs in the past two years, or if the candidate indicates he or she has a criminal record, HR staff may want to ask for additional information about those matters. Felonies and certain other types of crimes may make a candidate ineligible for employment. The pre-screen is performed on the official employment application that the candidate filled out and signed and that is considered the official document for the candidate's employment. In the pre-screen process, a recruiter reviews the candidate's application and checks off certain boxes. The checking off of particular boxes does not immediately eliminate the candidate, but it highlights or flags certain information or topics for an interviewer to discuss with the actual candidate. Thus, if the candidate had more than three jobs in a predetermined period of time, such as twenty-four months, according to the candidate's employment history on the employment application, the recruiter checks a box, and the interviewer knows to ask about the circumstances regarding the candidate's job changes.

Figure 15:
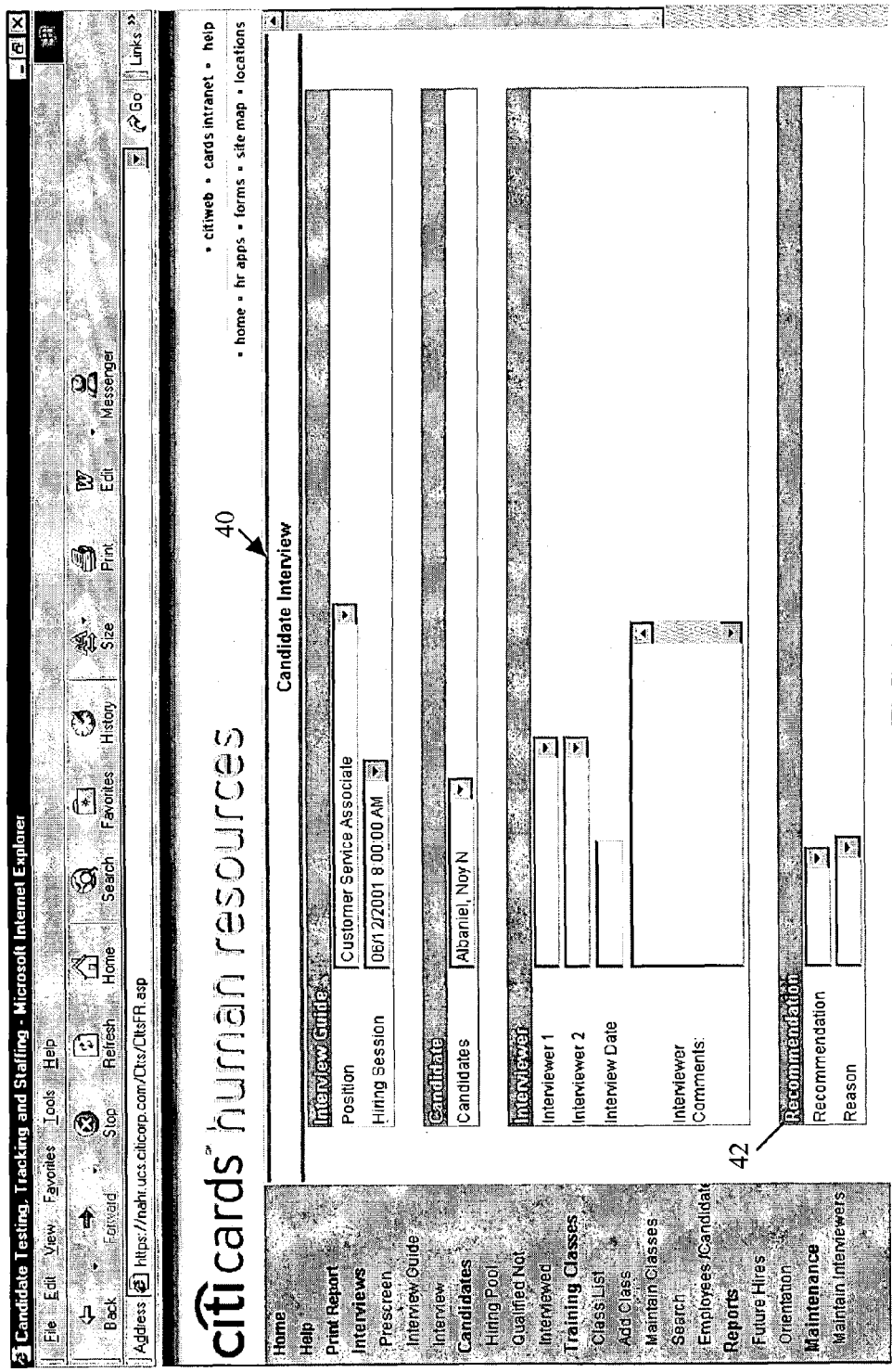
FIGS. 15 and 16 show a sample 'candidate interview' GUI screen for the testing, tracking, and staffing aspect of an embodiment of the invention.
Figure 16:
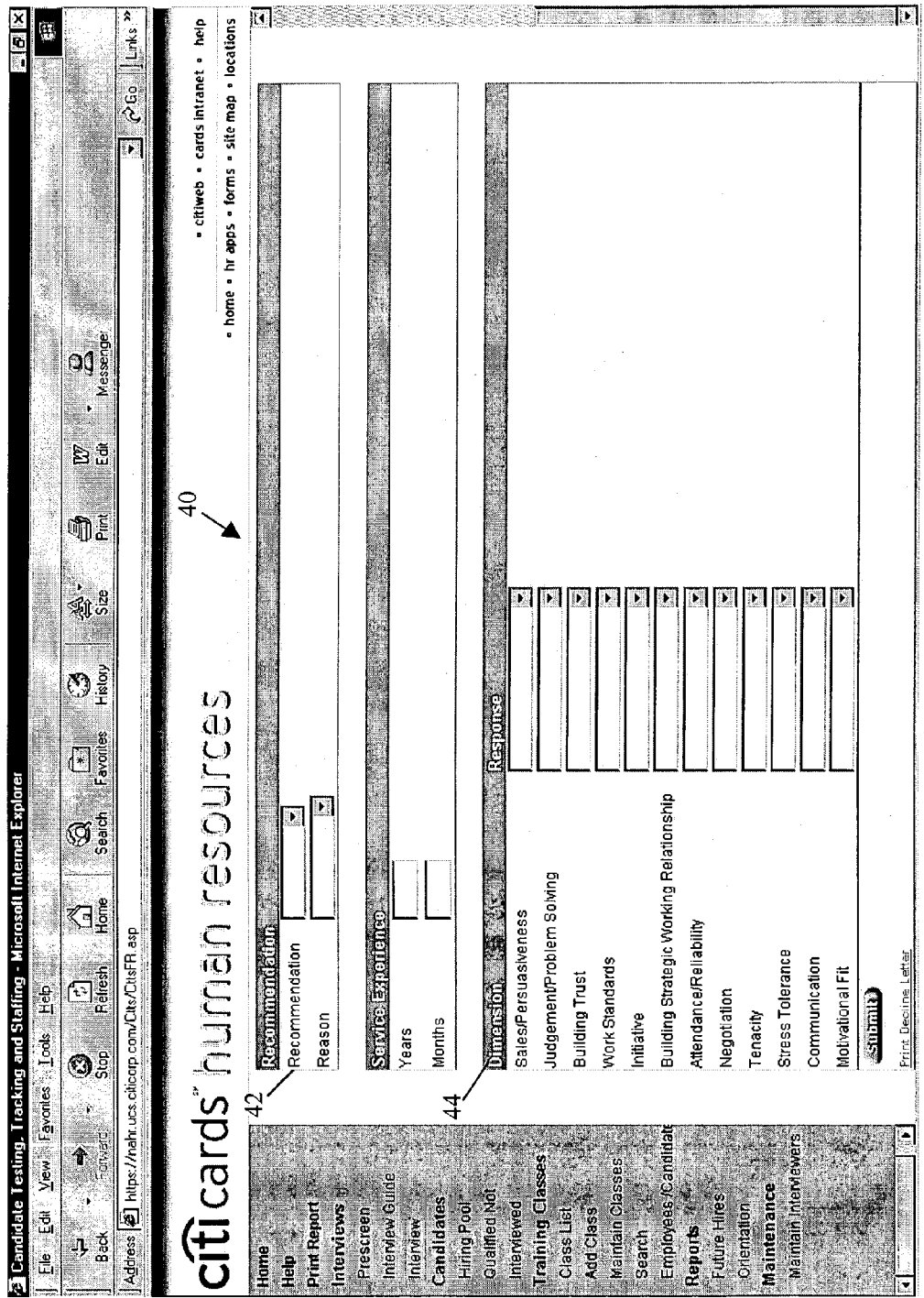

FIGS. 15 and 16 show a sample 'candidate interview' GUI screen 40 for the testing, tracking, and staffing aspect of an embodiment of the invention. The candidate interview screen 40 is provided for capturing results of an actual interview with the candidate. Once a candidate goes through the process of test qualifying, and staff personnel determine that the candidate should move further along in the process, the candidate is scheduled to sit down with a manager for an interview based on a matrix of predefined questions. When the manager completes the interview, the manager turns in manual paperwork to the HR department, and the HR department captures the interview results on the candidate interview screen 40. In a 'recommendation' field 42 of the 'candidate interview' screen 40, recommendations can include, for example, a recommendation to hire the candidate, to decline the candidate, or to refer the candidate to another position.

Figure 17:
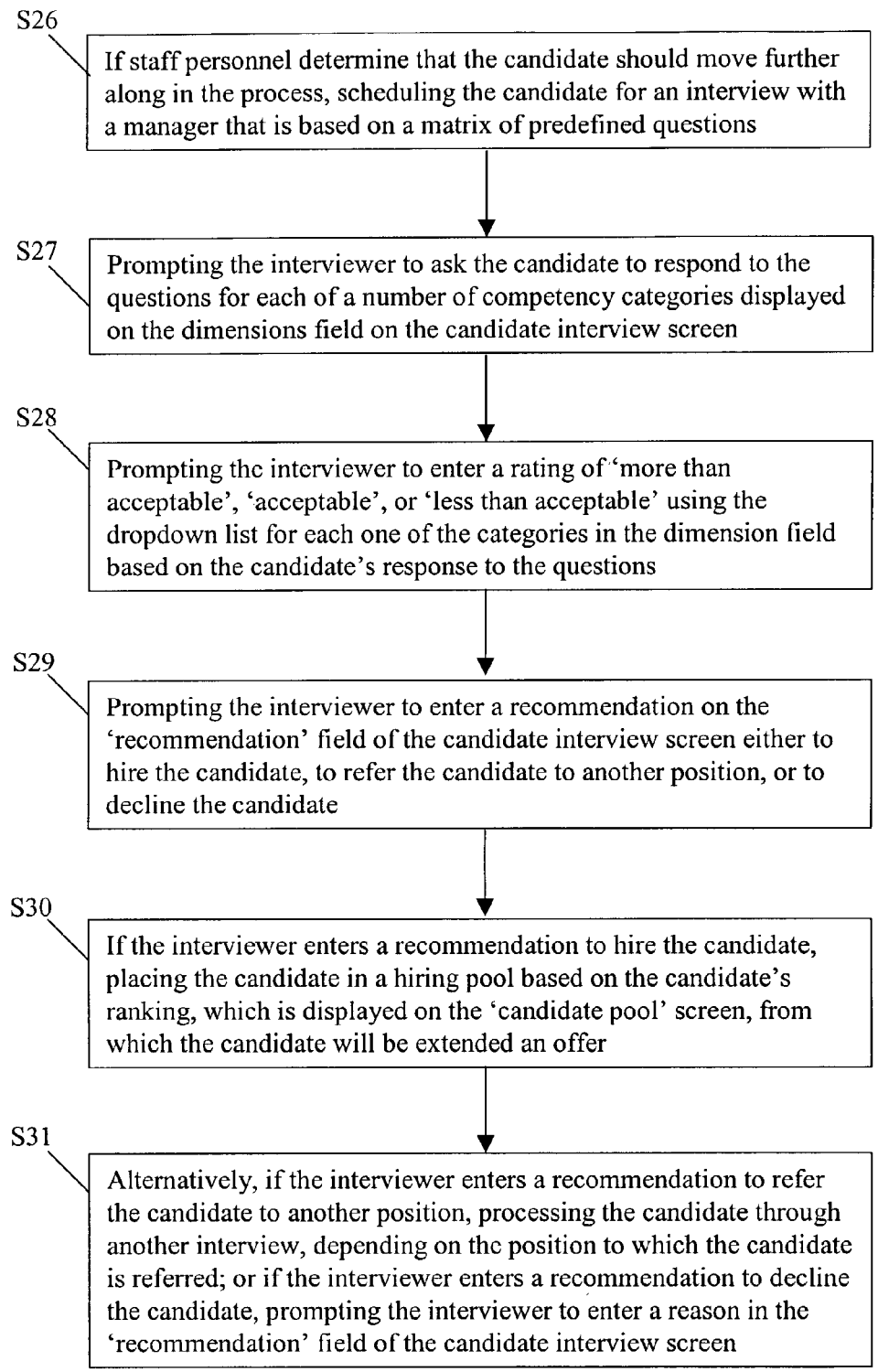
FIG. 17 is a flow chart that shows an example of the process of candidate interviewing for the testing, tracking, and staffing aspect of an embodiment of the invention.

FIG. 17 is a flow chart that shows an example of the process of candidate interviewing for the testing, tracking, and staffing aspect of an embodiment of the invention. Referring to FIG. 17, at S26, if staff personnel determine that the candidate should move further along in the process, the candidate is scheduled for an interview with a manager that is based on a matrix of predefined questions. At S27, the interviewer is prompted to ask the candidate to respond to the questions for each of a number of competency categories displayed on the 'dimensions' field 44 on the 'candidate interview' screen 40. At S28, the interviewer is prompted to enter a rating of 'more than acceptable', 'acceptable', or 'less than acceptable' using the dropdown list for each one of the categories in the 'dimension' field 44 based on the candidate's response to the questions.

Referring further to FIG. 17, at S29, the interviewer is also prompted to enter a recommendation on the 'recommendation' field 42 of the 'candidate interview' screen 40 either to hire the candidate, to refer the candidate to another position, or to decline the candidate. If the interviewer enters a recommendation to hire the candidate, at S30, the candidate is placed in a hiring pool based on the candidate's ranking, which is displayed on the 'candidate pool' screen 40, from which the candidate will be extended an offer. Alternatively, if the interviewer enters a recommendation to refer the candidate to another position, as S30, the candidate goes through another interview process, depending on the position to which the candidate is referred. If the interviewer enters a recommendation to decline the candidate, the interviewer is prompted to enter a reason in the 'recommendation' field 42 of the 'candidate interview' screen 40.

The flow of the candidate through the process depends upon the recommendation. If the recommendation is to extend an offer, that means that the candidate is a good candidate for employment, and the candidate is placed in a hiring pool, based upon the candidate's ranking, which is displayed on another screen known as a 'candidate pool' screen, from which the candidate will be hired. If the candidate is referred to another position, the candidate goes through another interview process, depending on the position to which the candidate is referred. If the candidate is declined, a reason is entered in the 'recommendation' field 42 of the candidate interview screen 40, such as the candidate is not qualified for the position or the like. On the other hand, after the interview process, a candidate can decide that he or she is no longer interested in the position and withdraw from the process.

A 'dimensions' field 44 on the 'candidate interview' screen 40 includes various areas or categories of competencies on which the interviewers key in. A series of questions is provided for each of the competency areas that the interviewer asks. At the end of the interview, the interviewer enters a rating for each one of the categories in the dimension field 44. For example, a drop down list is provided for the interviewer to choose either 'more than acceptable', 'acceptable', or 'less than acceptable'. Thus, for each of the categories, the interviewer marks whether the candidate is more than acceptable, acceptable, or less than acceptable for the particular category. Ideally, if a candidate is less than acceptable in any one category, the candidate is not an acceptable candidate and is declined. If the candidate is acceptable or more than acceptable in all of the categories, the candidate is an acceptable candidate and is extended an offer.

FIG. 18 shows an example of a 'candidate pool' GUI screen 50 for the testing, tracking, and staffing aspect of the invention. The 'candidate pool' screen 50 shows the hiring pool 52 into which a candidate who is chosen by the interviewer as a person to whom an offer should be extended is placed. Hiring pools 52 can be established for any number of positions. By default, the pool 52 ranks candidates based, for example, on their test scores, their interview results, and their years of experience in the type of position for which they are applying. Candidates are ranked, for example, in those three different orders, and they are also given an overall ranking based on where they fall in those three rankings. Thus, the employer is always able to hire from the top of the pool 52 based on the overall rankings in the process. If a decision is made to extend an offer, a user can click on a 'make offer' link in an 'extend offer' field 54 on the 'candidate pool' screen 50. Clicking on the 'make offer' link brings up an 'offer' screen on which predetermined salary rates are displayed based on the candidate's years of experience and the position for which the candidate is applying. If the candidate accepts the offer, the system in this aspect of the invention automatically generates an offer letter, places the candidate into an 'employees for future hire' category, and turns the candidate over to a staffing tracking system.

Figure 19:
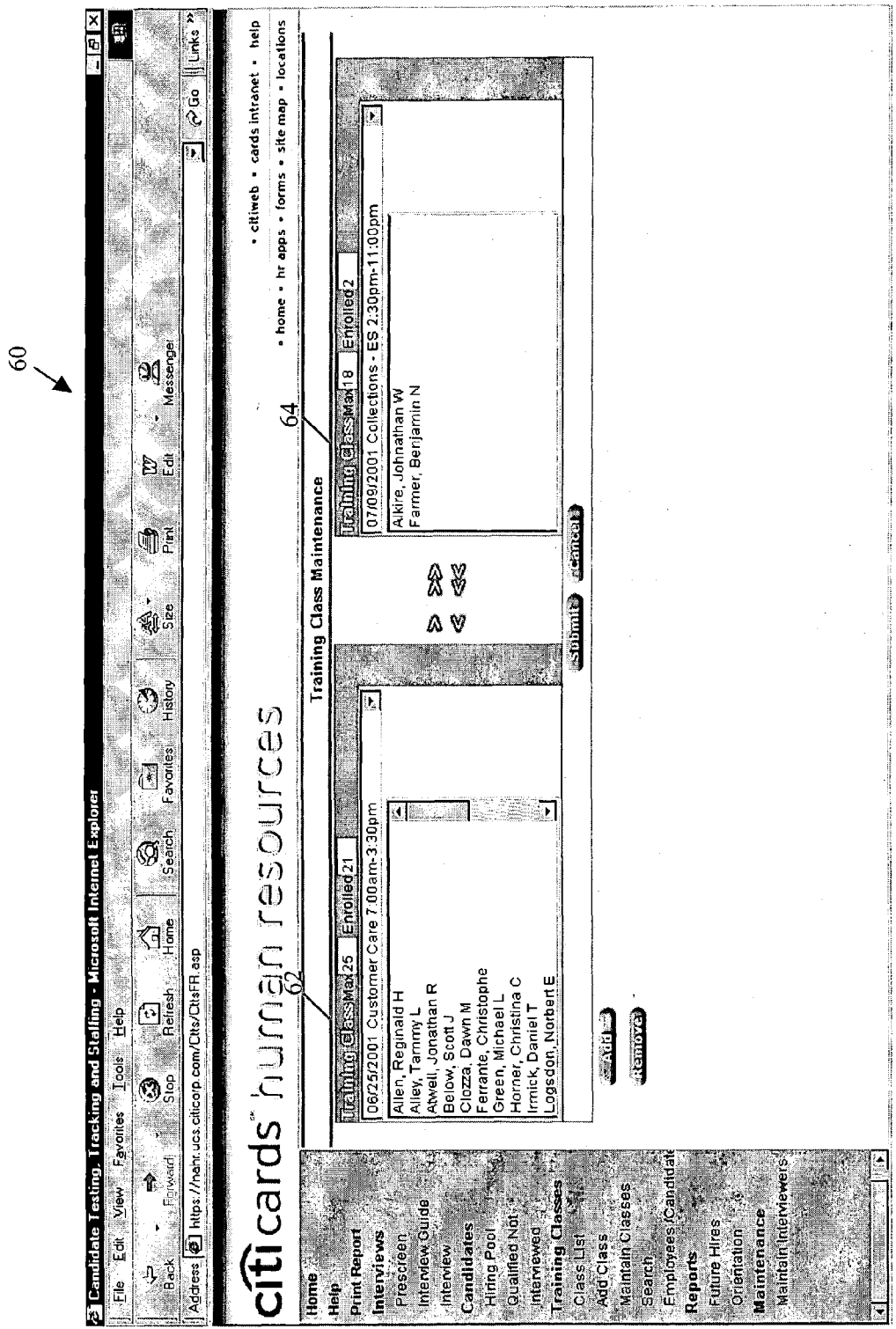
FIG. 19 shows an example of a 'training class maintenance' GUI screen for the testing, tracking, and staffing aspect of an embodiment of the invention.

Once a candidate accepts an offer, the candidate is assigned to a training class. FIG. 19 shows an example of a 'training class maintenance' GUI screen 60 for the testing, tracking, and staffing aspect of an embodiment of the invention. The 'training class maintenance' screen 60 is provided on which users can move candidates from one training class 62 to another training class 64. For example, if a candidate is hired to begin work on a certain date, but for some reason needs to change the start date, a user can move that candidate to a future start date for a different training class. Further, if a candidate does not appear for the first day of training, that candidate is considered a 'no-show', and a user can mark the particular candidate as a no-show, and/or enter a reason that the candidate did not appear for his or her first day of work and terminate the employment.

Figure 20:
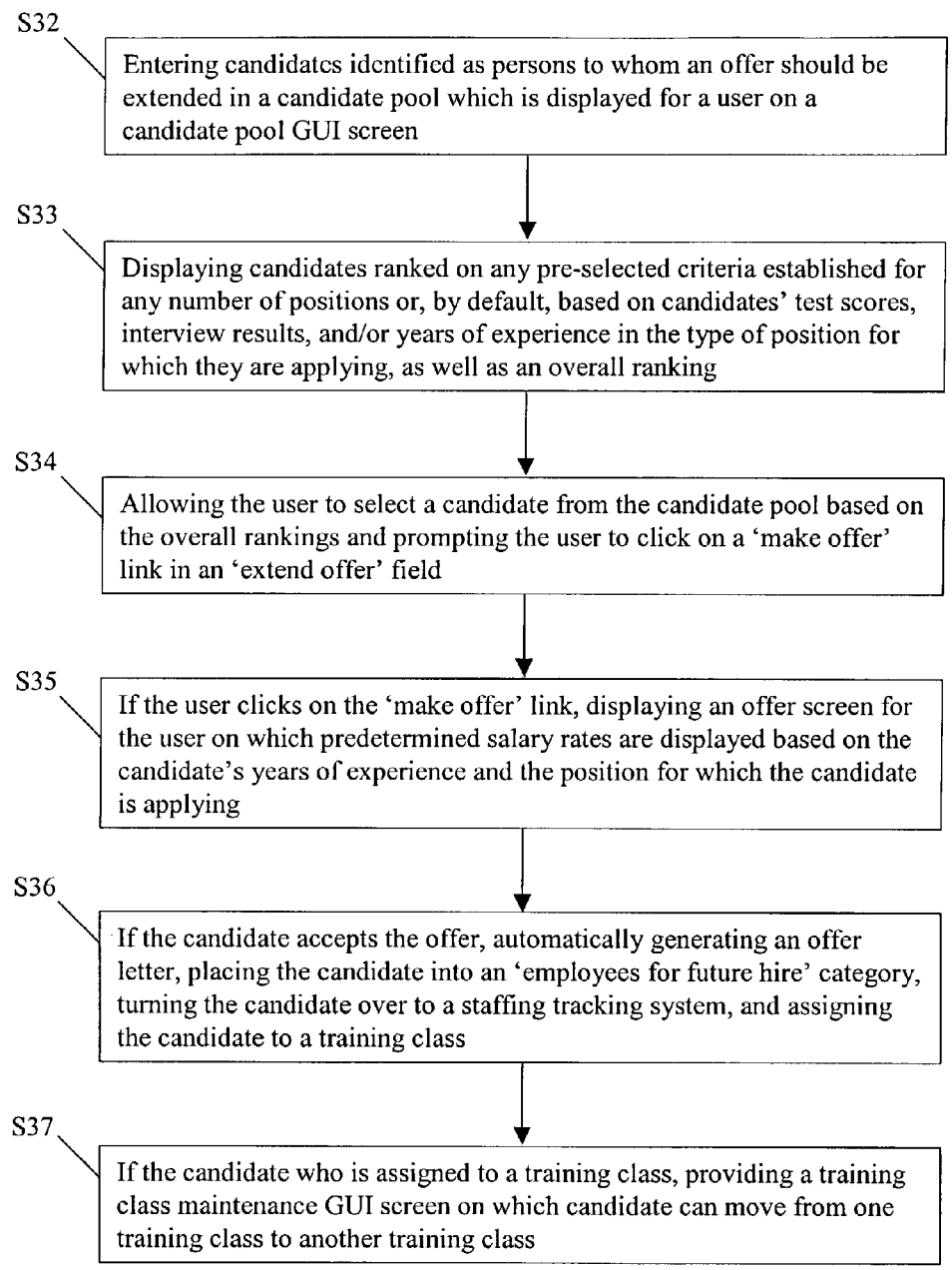
FIG. 20 is a flow chart that shows an example of the candidate hiring and training processes for the testing, tracking, and staffing aspect of an embodiment of the invention.

FIG. 20 is a flow chart that shows an example of the candidate hiring and training processes for the testing, tracking, and staffing aspect of an embodiment of the invention. Referring to FIG. 20, at S32, candidates identified as persons to whom an offer should be extended are placed in a candidate pool 52 which is displayed for a user on a 'candidate pool' GUI screen 50. At S33, the system displays candidates ranked on any pre-selected criteria established for any number of positions or, by default, based on candidates' test scores, interview results, and/or years of experience in the type of position for which they are applying, as well as an overall ranking. At S34, a user is allowed to select a candidate from the candidate pool 52 based on the overall rankings and click on a 'make offer' link in an 'extend offer' field 54. If the user clicks on the 'make offer' link, at S35, the system displays an 'offer' screen on which predetermined salary rates are displayed based on the candidate's years of experience and the position for which the candidate is applying. At S36, if the candidate accepts the offer, the system automatically generates an offer letter, places the candidate into an 'employees for future hire' category, turns the candidate over to a staffing tracking system, and the candidate is assigned to a training class. At S37, for candidates who are assigned to a training class, the 'training class maintenance' GUI screen 60 is provided on which candidates can be moved from one training class 62 to another training class 64.

Referring again to FIG. 11, an important feature of this aspect of the invention is the scannable bubble-in form 10 on which a candidate enters candidate information, such as his or her first name, last name, middle initial, home address, and certain EEO information. The raw information is scanned and extracted from the scannable form 10 into a text file. Once it is in the text file, for example, on a WINDOWS NT system running on the terminal 14, the candidate information is incorporated into the system of the invention. Thus, all of the candidate information, such as the candidate's name and the like is scanned into the system, and it is not necessary for an operator to key in the information. The candidate information that is extracted from the bubble-in form 10 is carried throughout all of the screens of the system. Another important feature of this aspect of an embodiment of the invention is integration with the process of the candidate tracking system which eventually keys the payroll, so all this information is sent directly to payroll.

The testing, tracking, and staffing aspect of the invention is optimized for a high-volume process and structures the process, for example, for recruiters, interviewers, and others involved in the staffing process. This aspect of the system automates and streamlines the process of hiring and training new employees and replaces the manual processes previously used. The system enables a user to simply pick the classes that meet the requirements for a candidate and streamlines that process as well. Another feature of this aspect of the invention is the test itself, although the test is only one factor in the process. A candidate's test score on the 'candidate pool' screen 50 is actually a composite score using a formula that is derived at least in part based on certain predetermined target goals. For example, a target goal can be for 55 percent of the people that pass through the system to actually qualify, based on statistical analysis, adverse impact studies, and the like.

Further, the testing, tracking, and staffing aspect of the invention utilizes a mix of tests, for example, for forms checking skills, reasoning, and reading comprehension. The consolidated test score is derived based on a predefined formula that weighs the different tests differently. The higher a candidate scores, the better he or she is qualified to a certain extent, but that is not necessarily the case, because the interview score is also factored in, since experience is very important. Additionally, one of the tests is not truly a test, but is more of a personality evaluation, which is factored into the candidate's score as well. The testing, tracking, and staffing aspect of the invention provides an interactive system that brings in, for example, test scores, interviews, the comments of interviewers, and the like, for a profile of a candidate and prioritizes that profile of the candidate.

The resume data management aspect of the invention utilizes, for example, computer hardware and software to identify and merge duplicate resume information in a resume tracking system to create a single unique resume in the tracking system, combining all of the relevant applicant information from the different versions of the applicant's resume in the tracking system. An embodiment of the invention is able to merge duplicate resume information together. For example, from any number of different resumes for the same applicant in a resume tracking system, the method and system for an embodiment of the present invention identifies the duplicates and deletes all but one of the duplicate resumes from the tracking system. Typically, an applicant may tailor his or her resumes for a number of particular jobs for which he or she is applying. Thus, there can be any number of different versions of the applicant's resume in the tracking system. A key feature of the method and system for an embodiment of the present invention merges the information from those different versions into one unique resume for the applicant that combines all of the different information from the different versions.

Figure 21:
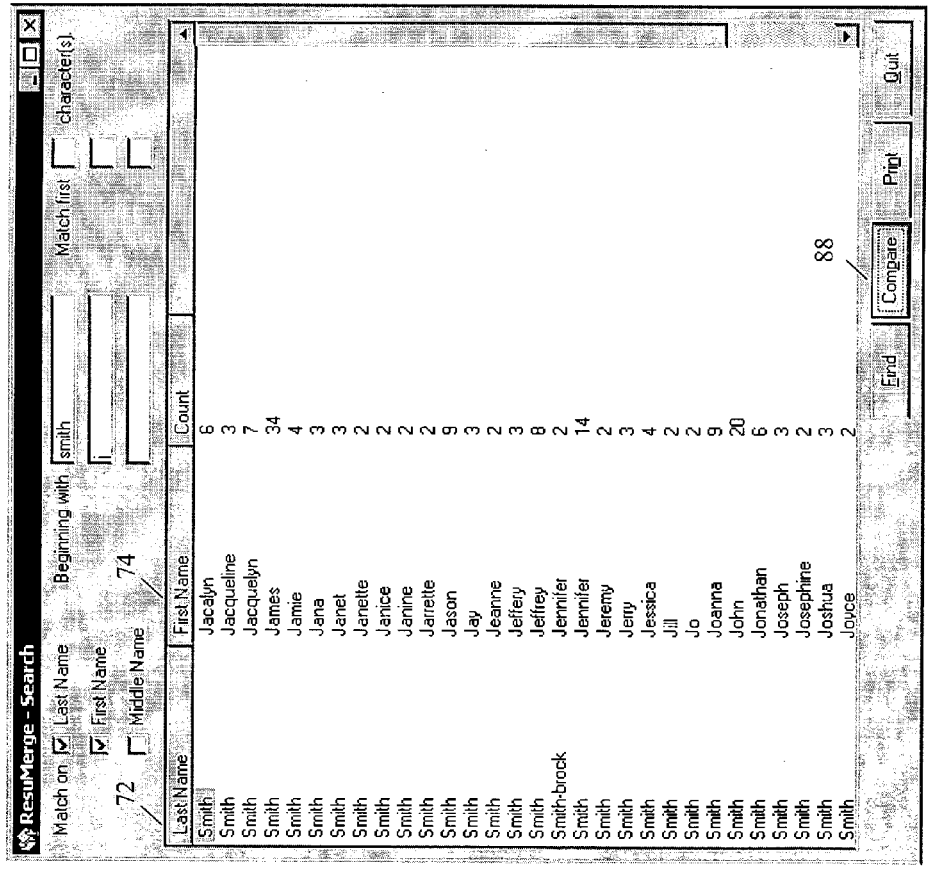
FIG. 21 shows an example of the search GUI screen for the resume data management aspect of an embodiment of the present invention.

The resume data management aspect of the present invention includes a searching facility. FIG. 21 shows an example of a 'search' GUI screen 70 for the resume data management aspect of an embodiment of the present invention. The 'search' screen 70 is the first screen presented after a user, such as a recruiter, logs into the application for an embodiment of the invention. The 'search' screen 70 allows the user to generate a list of possible duplicate resumes based on custom name search criteria that allows searching for and identifying duplicates in the system, for example, via last name 72 and/or first name 74 matches, as well as postal ZIP code matches and/or address matches and/or various other fields. The user can display the list of possible duplicate resumes on a 'resume list' screen 76, an example of which is illustrated in FIG. 22, by double-clicking a row in the 'results list' of the 'search' screen 70. The 'resume list' screen 76 displays information about the individual resumes, such as first name 78, middle name 80, last name 82, date the resume was received 84, as well as address and/or various other resume information, and allows the user to select the resumes to compare. For example, if there are ten resumes in the same first and last name at the same address, they are likely to be associated with the same applicant.

Figure 23:
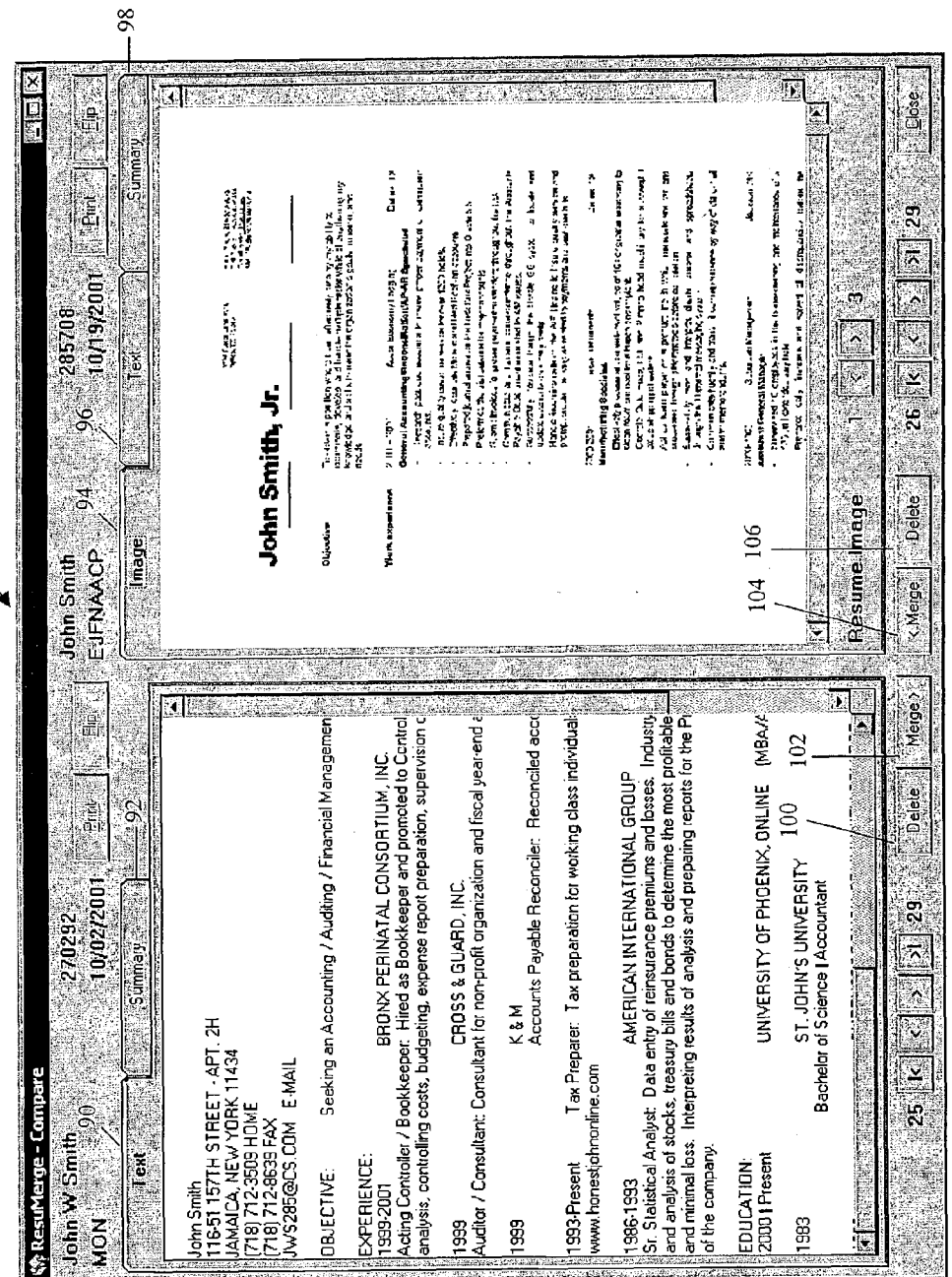
FIGS. 23 and 24 show examples of the compare GUI screen for the resume data management aspect of an embodiment of the present invention.
Figure 24:
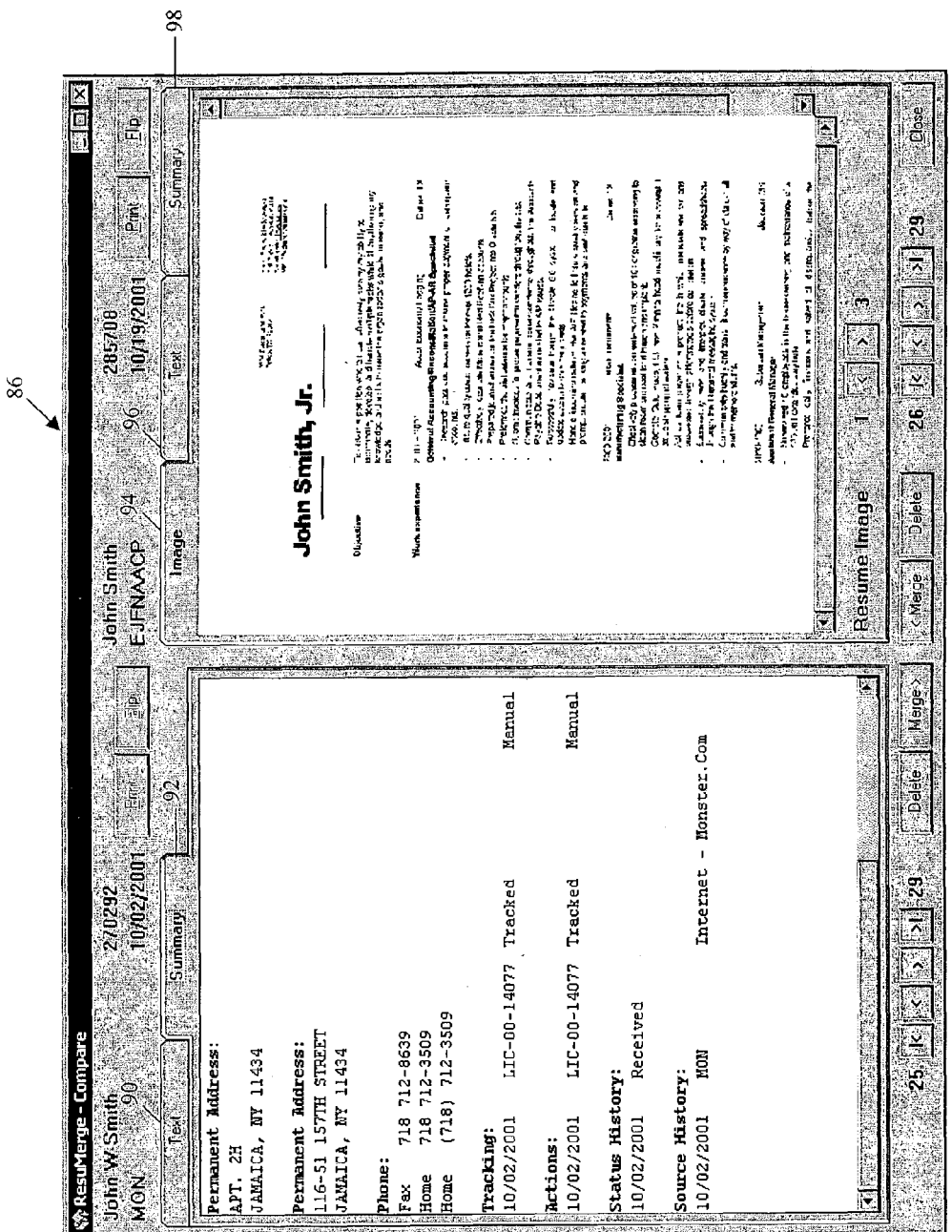

Once that duplication is identified, an important functionality of the resume data management aspect of the invention involves a determination of whether duplicate resumes should be deleted or merged, and based on that determination, either deleting or merging the duplicate resumes. A 'compare' GUI screen 86 is displayed for the user, examples of which are illustrated in FIGS. 23 and 24, by clicking, for example, on a 'compare' button 88 on the 'search' screen 70 or the 'list' screen 76. The 'compare' screen 86 is the main processing screen that allows resumes to be compared side-by-side prior to merging or deleting them. For example, the text 90 or the summary 92 of a resume for an applicant can be displayed on a portion of the 'compare' screen 86, and an image 94, text 96 or summary 98 of the another resume for the same applicant can be displayed simultaneously on another portion of the 'compare' screen 86. Thus, the resume data management aspect of the present invention provides, for example, a user interface for the user to compare the resumes visually and to deal appropriately with the resumes.

Figure 25:
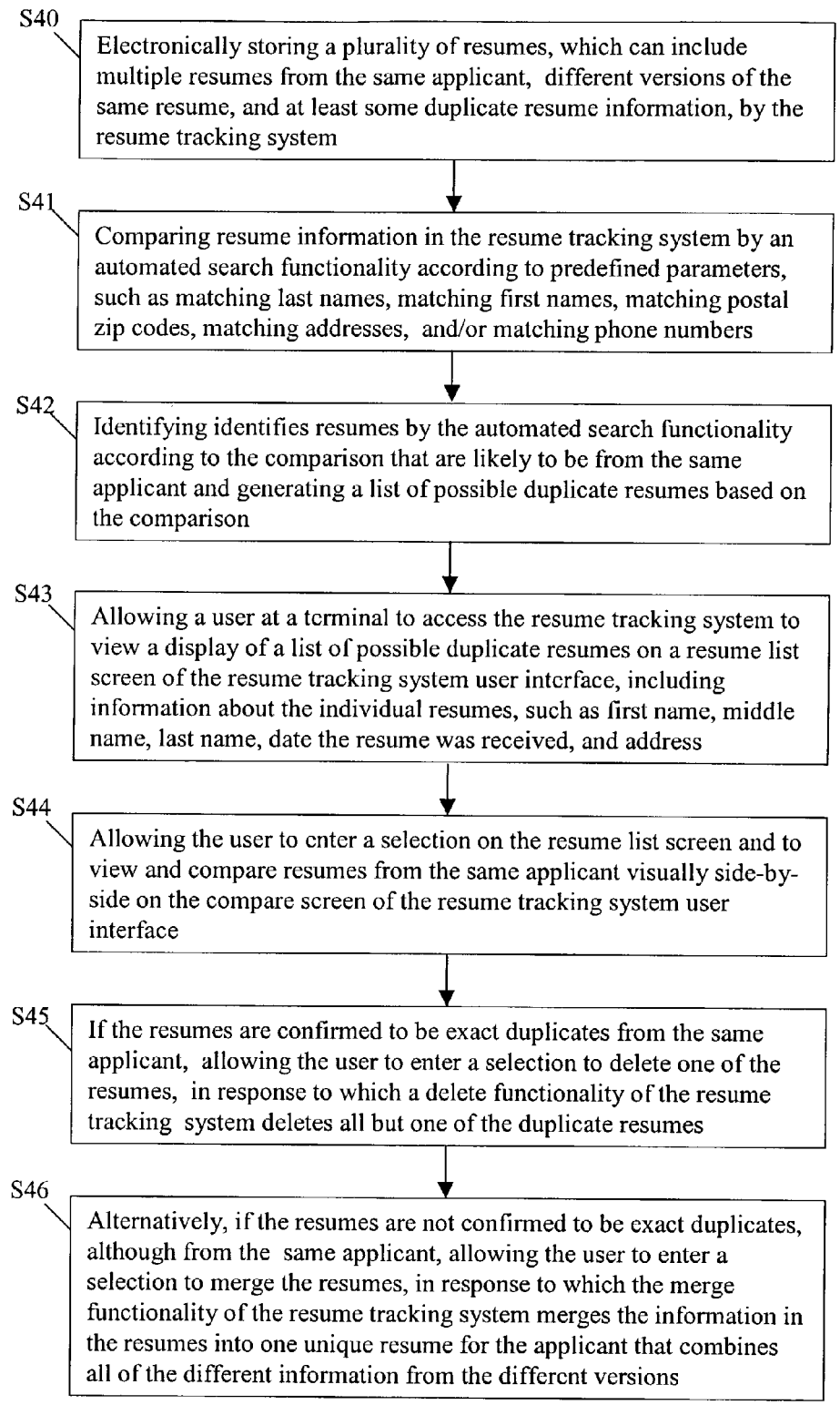
FIG. 25 is a flow chart which illustrates an example of the process of identifying and merging duplicate resume information for the resume data management aspect of an embodiment of the present invention.

FIG. 25 is a flow chart which illustrates an example of the process of identifying and merging duplicate resume information for the resume data management aspect of an embodiment of the invention. Referring to FIG. 25, at S40, a plurality of resumes, including multiple resumes from the same applicant, are stored electronically by the resume tracking system and may include different versions and may likely include at least some duplicate resume information. At S41, an automated search functionality of the resume tracking system compares resume information in the resume tracking system according to predefined parameters, such as matching last names, matching first names, matching postal zip codes, matching addresses, and matching phone numbers.

Referring further to FIG. 25, at S42, the automated search functionality identifies resumes according to the comparison that are likely to be from the same applicant and generates a list of possible duplicate resumes based on the comparison. At S43, a user at a terminal is allowed to access the resume tracking system to view a display of a list of possible duplicate resumes on the 'resume list' screen 76 of the resume tracking system user interface, including information about the individual resumes, such as first name 78, middle name 80, last name 82, date the resume was received 85, and address. At S44, the user is allowed enter a selection on the resume list screen 76 by clicking on a compare button 88 to view and compare resumes from the same applicant visually side-by-side on the compare screen 86 of the resume tracking system user interface.

Referring again to FIG. 25, at S45, upon confirming that the resumes are exact duplicates from the same applicant, the user is allowed to enter a selection, for example, by clicking on a delete button 100 or 104 to delete one of the resumes, in response to which one of the duplicate resumes is deleted by a delete functionality of the resume tracking system. Alternatively, at S46, upon confirming the resumes are not exact duplicates, although from the same application, the user is allowed to enter a selection, for example, by clicking on a merge button 102 or 104 to merge the resumes, in response to which the information in the resumes is merged into one unique resume for the applicant by a merge functionality of the resume tracking system that combines all of the different information from the different versions. Thus, a feature of the resume data management aspect of the invention is the comparison and/or identification of duplicate resumes that involves searching on a number of predefined parameters. For example, an automated parameter based search process identifies resumes that are likely duplicates according to a comparison of items, such as last names, first names, and phone numbers. Another feature of this aspect of the invention involves refining that search by an operator manually via the user interface. A final decision concerning the search and resume information merger can be made ultimately by the operator.

Various preferred embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the present invention.

What is claimed is:

1. A computer-implemented method of managing employment candidate data, comprising:

receiving at a computer terminal hardware device coupled via a computer network to a computer server hardware device an employment candidate's entry of a selection of an option for an employment position of interest to the candidate via a pre-screen computer software application program running at least in part on the server;

receiving at the terminal the employment candidate's entry of personal information and responses to a list of pre-screen questions via the pre-screen application;

verifying, by a validating functionality of the pre-screen application, that the employment candidate was not previously pre-screen disqualified for the employment position of interest to the employment candidate within a preceding pre-determined period of time of at least 90 days;

scoring the candidate as pre-screen qualified via the pre-screen application based on the candidate's responses to the list of pre-screen questions, wherein scoring the candidate as pre-screen qualified via the pre-screen application is conditioned at least in part upon entry by the candidate of a response to all questions on the list of pre-screen questions;

receiving at the terminal the pre-screen qualified employment candidate's entry of a selection to schedule at least one of a pre-employment test and a pre-employment interview via the pre-screen application;

electronically storing at least two different resumes of the candidate together with resumes for a plurality of other employment candidates via a resume tracking application program running at least in part on the computer server hardware device, each of said two different resumes consisting at least in part of information that exclusively identifies said employment candidate and each of said two different resumes consisting at least in part of different information relevant to at least two different employment positions;

searching the stored resumes by a computer software application search functionality of the resume tracking application according to predefined parameters based on the information that exclusively identifies the employment candidate;

identifying said at least two different electronically stored resumes of the employment candidate based on the information that exclusively identifies the employment candidate by the search functionality; and merging the at least two different electronically stored resumes of the employment candidate into a single unique electronically stored resume for the employment candidate consisting at least in part of all of the different information relevant to the at least two different employment positions from the at least two different electronically stored resumes by a merge functionality of the resume tracking application.

2. The method of claim 1, wherein receiving the candidate's entry of the selection of the option for the employment position further comprises allowing the candidate to log on to a pre-screen application website.

3. The method of claim 1, wherein receiving the candidate's entry of the selection of the option for the employment position of interest further comprises displaying a list of employment positions and employment position descriptions with a designation of which of the employment positions are currently available and which are currently unavailable on a positions GUI screen for the candidate via the pre-screen application.

4. The method of claim 3, wherein receiving the candidate's entry of the selection of the option for the employment position of interest further comprises prompting the candidate to enter the selection on the positions GUI screen via the pre-screen application.

5. The method of claim 4, wherein receiving the candidate's entry of the selection of the option for the employment position further comprises redirecting the candidate to another website functionality via the pre-screen application, if the employment position of interest is currently unavailable, with an explanation of how to use the other website functionality to receive notification once the a currently unavailable employment position becomes available.

6. The method of claim 1, wherein receiving the candidate's entry of the personal information further comprises prompting and allowing the candidate to enter the personal information on a personal information GUI screen via the pre-screen application.

7. The method of claim 1, wherein receiving the candidate's entry of the responses to the list of pre-screen questions further comprises prompting and allowing the candidate to enter the responses on a questionnaire GUI screen via the pre-screen application.

8. The method of claim 1, wherein receiving the candidate's entry of the selection of the option to schedule further comprises displaying a schedule GUI screen showing open slots for future pre-employment tests and pre-employment interviews for the candidate via the pre-screen application.

9. The method of claim 8, further comprising allowing the candidate an option to enter a selection to decline to schedule presently and displaying directions for the candidate for re-scheduling at a later time via the pre-screen application, if the open slots for future pre-employment tests and pre-employment interviews are inconvenient for the candidate.

10. The method of claim 1, further comprising:

receiving electronically scannable employment qualification test data and candidate-supplied application information for the employment candidate by a testing and tracking application via an optical scanning device associated with the local terminal coupled over a global resource network to at least one of the server and another server;

generating an employment qualification score for the candidate as one of qualified or not qualified for employment based at least in part on the employment qualification test data and aggregating and storing the test data in a local database associated with the local terminal and sending the aggregated test data and candidate-supplied application information over the global resource network to a centralized database associated with the at least one of the server and another server via the testing and tracking application;

allowing a staff member at a staff terminal coupled to the at least one of the server and another server over a network to enter a positive response on a meets requirements field of a pre-screen GUI screen with respect to the candidate via the testing and tracking application if the candidate meets pre-defined minimum employment requirements based on the candidate-supplied application information;

allowing an interviewer to enter a recommendation for hiring the candidate on a recommendation field of a candidate interview GUI screen based on an interview of the candidate according to a matrix of predefined interview questions displayed for the interviewer via the testing and tracking application;

allowing a user to enter a selection to make an offer to the candidate in an extend offer field of a candidate pool GUI screen based on a ranking of the candidate in a candidate pool displayed on the candidate pool GUI screen via the testing and tracking application;

displaying an offer GUI screen for the user showing a predetermined salary rate based on the candidate's experience and the position in which the candidate is interested via the testing and tracking application and allowing the user to extend an offer of employment to the candidate for the position of interest at the displayed salary rate; and if the candidate accepts the offer, allowing the user to proceed with at least one of generating an offer letter, placing the candidate into an employees for future hire category, turning the candidate over to a staffing tracking system, and assigning the candidate to a training class via the testing and tracking application.

11. A system for managing employment candidate data, comprising:
a pre-screen application running at least in part on a server coupled over a network to a terminal pre-programmed for receiving an employment candidate's entry at the terminal of a selection of an option for an employment position of interest to the candidate, for receiving at the terminal the employment candidate's entry of personal information and responses to a list of pre-screen questions, for verifying, by a validating functionality of the pre-screen application, that the employment candidate was not previously pre-screen disqualified for the employment position of interest to the candidate within a preceding pre-determined period of time of at least 90 days, for scoring the candidate as pre-screen qualified based on the candidate's responses to the list of pre-screen questions, wherein said scoring the candidate as pre-screen qualified is conditioned at least in part upon entry by the candidate of a response to all questions on the list of pre-screen questions, and for receiving at the terminal the pre-screen qualified employment candidate's entry of a selection to schedule at least one of a pre-employment test and a pre-employment interview via the pre-screen application;
a resume tracking application running at least on part on the server via which at least two different resumes of the employment candidate are electronically stored together with resumes for a plurality of other employment candidates, each of said two different resumes consisting at least in part of information that exclusively identifies said employment candidate and each of said two different resumes consisting at least in part of different information relevant to at least two different employment positions;
a search functionality of the resume tracking application that searches the stored resumes according to predefined parameters based on the information that exclusively identifies the employment candidate and that identifies said at least two different electronically stored resumes of the employment candidate; and
a merge functionality of the resume tracking application that merges the at least two different electronically stored resumes of the employment candidate into a single unique electronically stored resume for the employment candidate consisting at least in part of all of the different information relevant to the at least two different employment positions from the at least two different electronically stored resumes.

12. A method of managing employment candidate data, comprising:
receiving electronically scannable employment qualification test data and candidate-supplied application information for an employment candidate by a computer software testing and tracking application program executing at least in part on a computer server hardware device via an optical scanning computer hardware and software device associated with a local computer terminal hardware device coupled over a computer network to the computer server hardware device;
verifying, by a validating functionality of a pre-screen application executing at least in part on the computer server hardware device, that the employment candidate was not previously pre-screen disqualified for the employment position of interest to the candidate within a preceding pre-determined period of time of at least 90 days;
generating an employment qualification score for the candidate as one of qualified or not qualified for employment based at least in part on the employment qualification test data and aggregating and storing the test data in a local database associated with the local terminal and sending the aggregated test data and candidate-supplied application information over the network to a centralized computer software database application associated with the server via the testing and tracking application;
receiving a staff member's entry at a staff computer terminal hardware device coupled to the server over the network to enter a positive response on a meets requirements field of a pre-screen GUI computer screen with respect to the candidate via the testing and tracking application;
receiving an interviewer's entry of a recommendation for hiring the candidate on a recommendation field of a candidate interview GUI computer screen based on an interview of the candidate according to a matrix of pre-defined interview questions displayed for the interviewer at the staff computer terminal via the testing and tracking application, wherein receiving the interviewer's entry of the recommendation further comprises prompting the interviewer to ask the candidate to respond to the interview questions for each of a number of competency categories displayed for the interviewer on a dimensions field of the candidate interview GUI screen via the testing and tracking application, receiving the interviewer's entry of a rating for the candidate for each one of a plurality of categories displayed in the dimensions field of the candidate interview GUI screen via the testing and tracking application based on the candidate's response to the questions, and receiving the interviewer's entry of a recommendation for hiring the candidate on a recommendation field of the candidate interview GUI screen;
receiving a user's entry of a selection to make an offer to the candidate in an extend offer field of a candidate pool GUI computer screen based on a ranking of the candidate in a candidate pool displayed on the candidate pool GUI screen at the staff computer terminal via the testing and tracking application;
displaying an offer GUI computer screen for the user showing a predetermined salary rate based on the candidate's experience and a position in which the candidate is interested at the staff computer terminal via the testing and tracking application and prompting the user to extend an offer of employment to the candidate for the position of interest at the displayed salary rate;
prompting the user to proceed with at least one of generating an offer letter, placing the candidate into an employees for future hire category, turning the candidate over to a staffing tracking system, and assigning the candidate to a training class via the testing and tracking application in response to an acceptance of the offer by the candidate;
electronically storing at least two different resumes of the candidate together with resumes for a plurality of other employment candidates via a computer software resume tracking application program running at least in part on one of the computer server hardware device and another computer server hardware device coupled to one of the terminal and another computer terminal hardware device via one of the network and another computer network, each of said two different resumes consisting at least in part of information that exclusively identifies said employment candidate and each of said two different resumes consisting at least in part of different information relevant to at least two different employment positions;

searching the stored resumes by a computer software application search functionality of the resume tracking application according to predefined parameters based on the information that exclusively identifies the employment candidate;

identifying said at least two different electronically stored resumes of the employment candidate based on the information that exclusively identifies the employment candidate by the search functionality; and merging the at least two different electronically stored resumes of the employment candidate into a single unique electronically stored resume for the employment candidate consisting at least in part of all of the different information relevant to the at least two different employment positions from the at least two different electronically stored resumes by a merge functionality of the resume tracking application.

13. The method of claim 12, wherein receiving the electronically scannable test data further comprises allowing the candidate to complete a scannable employment qualification test and candidate-supplied application information form.

14. The method of claim 12, wherein generating the employment qualification score further comprises printing out one of a qualified for employment letter and a non-qualified for employment letter for the candidate via the testing and tracking application based at least in part on the employment qualification score.

15. The method of claim 12, wherein receiving the staff member's entry of the positive response with respect to the candidate further comprises displaying the candidate-supplied application information on the pre-screen GUI screen for the staff member via the testing and tracking application.

16. The method of claim 12, wherein receiving the user's entry of the selection to make an offer based on the ranking of the candidate in the candidate pool further comprises displaying the candidate pool on the candidate pool GUI screen showing the candidate ranked among other candidates on at least one pre-selected criteria established for at least one pre-determined employment position.

17. The method of claim 16, wherein receiving the user's entry of the selection to make an offer based on the ranking of the candidate in the candidate pool further comprises displaying the candidate pool on the candidate pool GUI screen showing the candidate ranked among other candidates on at least one pre-selected criteria from a group consisting at least in part of a test score, an interview result, prior experience, and an overall ranking for the candidate via the testing and tracking application.

18. The method of claim 12, wherein assigning the candidate to the training class further comprises receiving the candidate's entry of information on a training class maintenance GUI screen to change from the assigned training class to another training class via the testing and tracking application.

19. A system for managing employment candidate data, comprising:

a testing and tracking application running at least in part on a server coupled over a network to a local terminal pre-programmed for receiving electronically scannable employment qualification test data and candidate-supplied application information for an employment candidate via an optical scanning device associated with the local terminal;

a validating functionality of a pre-screen application running at least in part on the server preprogrammed for verifying that the employment candidate was not previously pre-screen disqualified for an employment position of interest to the candidate within a preceding pre-determined period of time of at least 90 days;

the testing and tracking application being programmed for generating an employment qualification score for the candidate as one of qualified or not qualified for employment based at least in part on the employment qualification test data and aggregating and storing the test data in a local database associated with the local terminal and sending the aggregated test data and candidate-supplied application information over the network to a centralized database associated with the server, and for allowing a staff member at a staff terminal coupled to the server over the network to enter a positive response on a meets requirements field of a pre-screen GUI screen with respect to the candidate via the testing and tracking application; and wherein the testing and tracking application is further pre-programmed for receiving an interviewer's entry of a recommendation for hiring the candidate on a recommendation field of a candidate interview GUI screen based on an interview of the candidate according to a matrix of predefined interview questions displayed for the interviewer, the testing and tracking application being additionally pre-programmed for prompting the interviewer to ask the candidate to respond to the interview questions for each of a number of competency categories displayed for the interviewer on a dimensions field of the candidate interview GUI screen, for receiving the interviewer's entry of a rating for the candidate for each one of a plurality of categories displayed in the dimensions field of the candidate interview GUI screen based on the candidate's response to the questions, and for receiving the interviewer's entry of a recommendation for hiring the candidate on a recommendation field of the candidate interview GUI screen, the testing and tracking application being further pre-programmed for allowing a user to enter a selection to make an offer to the candidate in an extend offer field of a candidate pool GUI screen based on a ranking of the candidate among other candidates in a candidate pool displayed on the candidate pool GUI screen, for displaying an offer GUI screen for the user showing a predetermined salary rate based on the candidate's experience and a position for which the candidate is interested and allowing the user to extend an offer of employment to the candidate for the position at the salary rate, and for allowing the user to proceed with at least one of generating an offer letter, placing the candidate into an employees for future hire category, turning the candidate over to a staffing tracking system, and assigning the candidate to a training class via the testing and tracking application;

a resume tracking application running at least on part on at least one of the server and another server coupled to at least one of the terminal and another terminal over a network via which at least two different resumes of the employment candidate are electronically stored together with resumes for a plurality of other employment candidates, each of said two different resumes consisting at least in part of information that exclusively identifies said employment candidate and each of said two different resumes consisting at least in part of different information relevant to at least two different employment positions;

a search functionality of the resume tracking application that searches the stored resumes according to predefined parameters based on the information that exclusively identifies the employment candidate and that identifies said at least two different electronically stored resumes of the employment candidate; and a merge functionality of the resume tracking application that merges the at least two different electronically stored resumes of the employment candidate into a single unique electronically stored resume for the employment candidate consisting at least in part of all of the different information relevant to the at least two different employment positions from the at least two different electronically stored resumes.

20. A method of managing employment candidate data, comprising:

electronically storing at least two different resumes of an employment candidate together with resumes for a plurality of other employment candidates via a computer software resume tracking application program running at least in part on a computer server hardware device coupled to a computer terminal hardware device via a computer network, each of said two different resumes consisting at least in part of information that exclusively identifies said employment candidate and each of said two different resumes consisting at least in part of different information relevant to at least two different employment positions;

searching the stored resumes by a computer software application search functionality of the resume tracking application according to predefined parameters based on the information that exclusively identifies the employment candidate;

identifying said at least two different electronically stored resumes of the employment candidate based on the information that exclusively identifies the employment candidate by the search functionality; and merging the at least two different electronically stored resumes of the employment candidate into a single unique electronically stored resume for the employment candidate consisting at least in part of all of the different information relevant to the at least two different employment positions from the at least two different electronically stored resumes by a merge functionality of the resume tracking application; and verifying, by a validating functionality of a pre-screen application running at least in part on the computer server hardware device, that the employment candidate was not previously pre-screen disqualified for the employment position of interest to the candidate within a preceding pre-determined period of time of at least 90 days.

21. The method of claim 20, wherein searching the stored resumes according to the predefined parameters further comprises searching the stored resumes based on information consisting of at least one of a candidate surname, a candidate first name, a candidate postal zip code, a candidate address, and a candidate phone number via the resume tracking application.

22. The method of claim 20, further comprising:

allowing the candidate at one of the terminal and another terminal coupled via one of the network and another network to one of the server and another server an option to enter a selection for an employment position of interest to the candidate via a pre-screen application running at least in part on the one of the server and another server;

if the candidate enters the selection, allowing the candidate to enter personal information and responses to a list of pre-screen questions via the pre-screen application;

scoring the candidate as one of pre-screen qualified, pre-screen not qualified, and pre-screen qualified prior employee via the pre-screen application based on the candidate's responses to the list of pre-screen questions; and if the candidate is scored as pre-screen qualified, allowing the candidate an option to enter a selection to schedule at least one of a pre-employment test and a pre-employment interview via the pre-screen application.

23. A system for managing employment candidate data, comprising:

a resume tracking application running at least on part on a server coupled to a terminal via a network via which at least two different resumes of an employment candidate are electronically stored together with resumes for a plurality of other employment candidates, each of said two different resumes consisting at least in part of information that exclusively identifies said employment candidate and each of said two different resumes consisting at least in part of different information relevant to at least two different employment positions;

a search functionality of the resume tracking application that searches the stored resumes according to predefined parameters based on the information that exclusively identifies the employment candidate and that identifies said at least two different electronically stored resumes of the employment candidate; and a merge functionality of the resume tracking application that merges the at least two different electronically stored resumes of the employment candidate into a single unique electronically stored resume for the employment candidate consisting at least in part of all of the different information relevant to the at least two different employment positions from the at least two different electronically stored resumes; and a validating functionality of a pre-screen application running at least on part on the server that verifies that the employment candidate was not previously pre-screen disqualified for the employment position of interest to the candidate within a preceding pre-determined period of time of at least 90 days.

24. A method of managing employment candidate data, comprising:

receiving at a computer terminal hardware device coupled via a computer network to a computer server hardware device an employment candidate's entry of a selection of an option for an employment position of interest to the candidate via a pre-screen computer software application program running at least in part on the server;

receiving at the terminal personal information and responses to a list of pre-screen questions via the pre-screen application;

verifying, by a validating functionality of the pre-screen application, that the employment candidate was not previously pre-screen disqualified for the employment position of interest to the candidate within a preceding pre-determined period of time of at least 90 days;

scoring the candidate as pre-screen qualified via the pre-screen application based on the candidate's responses to the list of pre-screen questions, wherein scoring the candidate as pre-screen qualified via the pre-screen application is conditioned at least in part upon entry by the candidate of a response to all questions on the list of pre-screen questions;

receiving at the terminal the pre-screen qualified employment candidate's entry of a selection to schedule at least one of a pre-employment test and a pre-employment interview via the pre-screen application electronically storing at least two different resumes of the candidate together with resumes for a plurality of other employment candidates via a computer software resume tracking application program running at least in part on one of the computer server hardware device and another computer server hardware device coupled to one of the terminal and another computer terminal hardware device via one of the network and another computer network, each of said two different resumes consisting at least in part of information that exclusively identifies said employment candidate and each of said two different resumes consisting at least in part of different information relevant to at least two different employment positions;

searching the stored resumes by a computer software application search functionality of the resume tracking application according to predefined parameters based on the information that exclusively identifies the employment candidate;

identifying said at least two different electronically stored resumes of the employment candidate based on the information that exclusively identifies the employment candidate by the search functionality;

merging the at least two different electronically stored resumes of the employment candidate into a single unique electronically stored resume for the employment candidate consisting at least in part of all of the different information relevant to the at least two different employment positions from the at least two different electronically stored resumes by a merge functionality of the resume tracking application;

receiving electronically scannable employment qualification test data and candidate-supplied application information for the employment candidate by a computer software testing and tracking application program executing at least in part on a computer server hardware device via an optical scanning computer hardware and software device associated with a local computer terminal hardware device coupled over a global resource computer network to one of the server and said another server;

generating an employment qualification score for the candidate as one of qualified or not qualified for employment based at least in part on the employment qualification test data and aggregating and storing the test data in a local database associated with the local terminal and sending the aggregated test data and candidate-supplied application information over the global resource network to a centralized computer software database associated with the one of the server and said another server via the testing and tracking application;

receiving a staff member's entry at a staff computer terminal hardware device coupled to the one of the server and said another server over said one of the network and said another network to enter a positive response on a meets requirements field of a pre-screen GUI computer screen with respect to the candidate via the testing and tracking application;

receiving an interviewer's entry of a recommendation for hiring the candidate on a recommendation field of a candidate interview GUI computer screen based on an interview of the candidate according to a matrix of predefined interview questions displayed for the interviewer at the staff computer terminal via the testing and tracking application, wherein receiving the interviewer's entry of the recommendation further comprises prompting the interviewer to ask the candidate to respond to the interview questions for each of a number of competency categories displayed for the interviewer on a dimensions field of the candidate interview GUI screen via the testing and tracking application, receiving the interviewer's entry of a rating for the candidate for each one of a plurality of categories displayed in the dimensions field of the candidate interview GUI screen via the testing and tracking application based on the candidate's response to the questions, and receiving the interviewer's entry of a recommendation for hiring the candidate on a recommendation field of the candidate interview GUI screen;

receiving a user's entry of a selection to make an offer to the candidate in an extend offer field of a candidate pool GUI computer screen based on a ranking of the candidate in a candidate pool displayed on the candidate pool GUI computer screen at the staff computer terminal via the testing and tracking application;

displaying an offer GUI computer screen for the user showing a predetermined salary rate based on the candidate's experience and the position in which the candidate is interested at the staff computer terminal via the testing and tracking application and prompting the user to extend an offer of employment to the candidate for the position of interest at the displayed salary rate; and prompting the user to proceed with at least one of generating an offer letter, placing the candidate into an employees for future hire category, turning the candidate over to a staffing tracking system, and assigning the candidate to a training class via the testing and tracking application in response to an acceptance of the offer by the candidate.

25. A system for managing employment candidate data, comprising:

a pre-screen application running at least in part on a server coupled over a network to a terminal pre-programmed for receiving an employment candidate's entry at the terminal of a selection of an option for an employment position of interest to the candidate, for receiving at the terminal the employment candidate's entry of personal information and responses to a list of pre-screen questions;

a validating functionality of the pre-screen application running at least in part on the server preprogrammed for verifying that the employment candidate was not previously pre-screen disqualified for the employment position of interest to the candidate within a preceding predetermined period of time of at least 90 days;

the pre-screen application being programmed for scoring the candidate as pre-screen qualified based on the candidate's responses to the list of pre-screen questions, wherein said scoring the candidate as pre-screen qualified is conditioned at least in part upon entry by the candidate of a response to all questions on the list of pre-screen questions, and for receiving at the terminal the pre-screen qualified employment candidate's entry of a selection to schedule at least one of a pre-employment test and a pre-employment interview via the pre-screen application;

a resume tracking application running at least in part on one of the server and another server coupled to one of the terminal and another terminal via one of the network and another network pre-programmed for electronically storing at least two different resumes of the employment candidate together with resumes for a plurality of other employment candidates, each of said two different resumes consisting at least in part of information that exclusively identifies said employment candidate and each of said two different resumes consisting at least in part of different information relevant to at least two different employment positions;

a search functionality of the resume tracking application that searches the stored resumes according to predefined parameters based on the information that exclusively identifies the employment candidate and that identifies said at least two different electronically stored resumes of the employment candidate; and a merge functionality of the resume tracking application that merges the at least two different electronically stored resumes of the employment candidate into a single unique electronically stored resume for the employment candidate consisting at least in part of all of the different information relevant to the at least two different employment positions from the at least two different electronically stored resumes;

wherein the testing and tracking application is further pre-programmed for receiving an interviewer's entry of a recommendation for hiring the candidate on a recommendation field of a candidate interview GUI screen based on an interview of the candidate according to a matrix of predefined interview questions displayed for the interviewer, the testing and tracking application being additionally pre-programmed for prompting the interviewer to ask the candidate to respond to the interview questions for each of a number of competency categories displayed for the interviewer on a dimensions field of the candidate interview GUI screen, for receiving the interviewer's entry of a rating for the candidate for each one of a plurality of categories displayed in the dimensions field of the candidate interview GUI screen based on the candidate's response to the questions, and for receiving the interviewer's entry of a recommendation for hiring the candidate on a recommendation field of the candidate interview GUI screen, the testing and tracking application being further pre-programmed for allowing a user to enter a selection to make an offer to the candidate in an extend offer field of a candidate pool GUI screen based on a ranking of the candidate among other candidates in a candidate pool displayed on the candidate pool GUI screen, for displaying an offer GUI screen for the user showing a predetermined salary rate based on the candidate's experience and a position for which the candidate is interested and allowing the user to extend an offer of employment to the candidate for the position at the salary rate, and for allowing the user to proceed with at least one of generating an offer letter, placing the candidate into an employees for future hire category, turning the candidate over to a staffing tracking system, and assigning the candidate to a training class via the testing and tracking application;

a testing and tracking application running at least in part on the one of the server and another server coupled over a global resource network to a local terminal pre-programmed for receiving electronically scannable employment qualification test data and candidate-supplied application information for an employment candidate via an optical scanning device associated with the local terminal, for generating an employment qualification score for the candidate as one of qualified or not qualified for employment based at least in part on the employment qualification test data and aggregating and storing the test data in a local database associated with the local terminal and sending the aggregated test data and candidate-supplied application information over the network to a centralized database associated with the one of the server and another server, and for allowing a staff member at a staff terminal coupled to the one of the server and another server over the one of the network and another network to enter a positive response on a meets requirements field of a pre-screen GUI screen with respect to the candidate; and wherein the testing and tracking application is further pre-programmed for receiving an interviewer's entry of a recommendation for hiring the candidate on a recommendation field of a candidate interview GUI screen based on an interview of the candidate according to a matrix of predefined interview questions displayed for the interviewer, the testing and tracking application being additionally pre-programmed for prompting the interviewer to ask the candidate to respond to the interview questions for each of a number of competency categories displayed for the interviewer on a dimensions field of the candidate interview GUI screen, for receiving the interviewer's entry of a rating for the candidate for each one of a plurality of categories displayed in the dimensions field of the candidate interview GUI screen based on the candidate's response to the questions, and for receiving the interviewer's entry of a recommendation for hiring the candidate on a recommendation field of the candidate interview GUI screen, the testing and tracking application being further pre-programmed for allowing a user to enter a selection to make an offer to the candidate in an extend offer field of a candidate pool GUI screen based on a ranking of the candidate among other candidates in a candidate pool displayed on the candidate pool GUI screen, for displaying an offer GUI screen for the user showing a predetermined salary rate based on the candidate's experience and the position in which the candidate is interested and allowing the user to extend an offer of employment to the candidate for the position of interest at the displayed salary rate, and for allowing the user to proceed with at least one of generating an offer letter, placing the candidate into an employees for future hire category, turning the candidate over to a staffing tracking system, and assigning the candidate to a training class.

\* \* \* \* \*